United States Patent
Yao et al.

(10) Patent No.: US 9,262,034 B2
(45) Date of Patent: Feb. 16, 2016

(54) ELECTROMAGNETIC INDUCTIVE TOUCH PANEL AND DRIVE DETECTION METHOD THEREOF AND COORDINATE INPUT APPARATUS

(71) Applicants: SHANGHAI TIANMA MICRO-ELECTRONICS CO., LTD, Shanghai (CN); TIANMA MICRO-ELECTRONICS CO., LTD., Shenzhen (CN)

(72) Inventors: Qijun Yao, Shanghai (CN); Feng Lu, Shanghai (CN); Xianxiang Zhang, Shanghai (CN)

(73) Assignees: SHANGHAI TIANMA MICRO-ELECTRONICS CO., LTD, Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 9 days.

(21) Appl. No.: 14/492,070

(22) Filed: Sep. 22, 2014

(65) Prior Publication Data

US 2015/0338968 A1 Nov. 26, 2015

(30) Foreign Application Priority Data

May 21, 2014 (CN) .......................... 2014 1 0217894

(51) Int. Cl.
| G06F 3/046 | (2006.01) |
| G06F 3/041 | (2006.01) |
| G06F 3/0354 | (2013.01) |
| G06F 3/038 | (2013.01) |

(52) U.S. Cl.
CPC .............. *G06F 3/046* (2013.01); *G06F 3/0383* (2013.01); *G06F 3/03545* (2013.01); *G06F 3/0416* (2013.01)

(58) Field of Classification Search
None
See application file for complete search history.

(56) References Cited

U.S. PATENT DOCUMENTS

| 6,784,876 | B1 | 8/2004 | Nagai et al. |
| 8,134,542 | B2 | 3/2012 | Hagen et al. |
| 2008/0128180 | A1* | 6/2008 | Perski ..................... G06F 3/046 178/18.03 |
| 2008/0150914 | A1* | 6/2008 | Yamamoto .............. G06F 3/046 345/175 |
| 2014/0043283 | A1* | 2/2014 | Kim ....................... G06F 3/0416 345/174 |
| 2014/0043301 | A1* | 2/2014 | Katsurahira ............ G06F 3/044 345/179 |
| 2014/0354560 | A1* | 12/2014 | Kim ....................... G06F 3/041 345/173 |
| 2015/0049031 | A1* | 2/2015 | Maruoka ............. G06F 3/03545 345/173 |
| 2015/0091856 | A1* | 4/2015 | Park ....................... G06F 3/0416 345/174 |

(Continued)

FOREIGN PATENT DOCUMENTS

CN 1194282 3/2005

*Primary Examiner* — Ryan A Lubit
(74) *Attorney, Agent, or Firm* — Kilpatrick Townsend & Stockton LLP

(57) ABSTRACT

Embodiments of the invention provide an electromagnetic inductive touch panel for detecting a touch position of an electromagnetic stylus including a first resonant circuit and a second resonant circuit, the electromagnetic inductive touch panel including: a plurality of first coils extending in a first direction, wherein at least one of the first coils emits a first electromagnetic signal at a first frequency, and the first resonant circuit receives the first electromagnetic signal and then resonates to generate a first reflected signal at the first frequency; and a plurality of second coils extending in a second direction, wherein at least one of the second coils emits a second electromagnetic signal at a second frequency, and the second resonant circuit receives the second electromagnetic signal and then resonates to generate a second reflected signal at the second frequency.

23 Claims, 18 Drawing Sheets

(56) References Cited

U.S. PATENT DOCUMENTS

2015/0103039 A1* 4/2015 Cho .................. G06F 3/044
    345/174

2015/0268742 A1* 9/2015 Park .................. G06F 3/03545
    345/179

* cited by examiner

Emission and reflection processes include a first coil emission and reflection process (a first drive signal is applied to at least one first coil to make it emit a first electromagnetic signal at a first frequency, and a first resonant circuit receives the first electromagnetic signal and then resonates to generate a first reflected signal at the first frequency) and a second coil emission and reflection process (a second drive signal is applied to at least one second coil to make it emit a second electromagnetic signal at a second frequency, and a second resonant circuit receives the second electromagnetic signal and then resonates to generate a second reflected signal at the second frequency)

↓

A reception process: inductive signals are detected from pre-selected first coils and second coils (first inductive signals are detected from a plurality of first coils, and the coordinate value of the touch position of the electromagnetic stylus in a second direction is determined from the first inductive signals, and second inductive signals are detected from a plurality of second coils, and the coordinate value of the touch position of the electromagnetic stylus in a first direction is determined from the second inductive signals)

Fig. 12

Second-direction preliminary detection and first-direction preliminary detection (in the first scheme or the second scheme)

↓

Second-direction precise detection and first-direction precise detection

Fig. 13

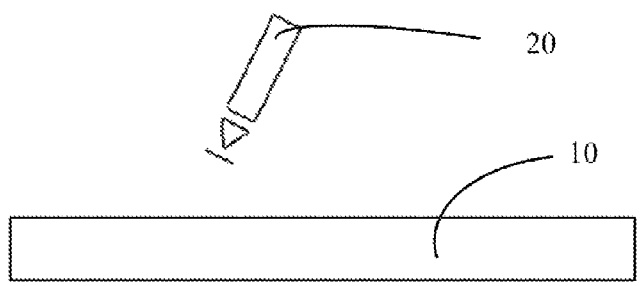

ELECTROMAGNETIC INDUCTIVE TOUCH PANEL AND DRIVE DETECTION METHOD THEREOF AND COORDINATE INPUT APPARATUS

CROSS-REFERENCES TO RELATED APPLICATIONS

This application claims priority to Chinese Patent Application No. 201410217894.X, entitled "ELECTROMAGNETIC INDUCTIVE TOUCH PANEL AND DRIVE DETECTION METHOD THEREOF AND COORDINATE INPUT APPARATUS", filed with the State Intellectual Property Office of People's Republic of China on May 21, 2014, the content of which is incorporated herein by reference in its entirety for all purposes.

BACKGROUND OF THE INVENTION

In recent years, touch panels, and display panels and display devices with a touch function, have been increasingly popular as they become friendly, convenient and prompt to operate. The touch panels can be categorized by their different operation principles into, for example, a resistive-type touch panel, a capacitive-type touch panel, an electromagnetic inductive-type touch panel, etc. Particularly the resistive touch panel and the capacitive touch panel are advantageous in their possibility of being operated directly with a hand or finger. However it may be difficult to distinguish touching by the hand or finger from touching by a stylus while writing with the stylus because the hand or finger is generally placed on the touch panel. The electromagnetic inductive touch panel generally includes a plurality of electromagnetic inductive coils or antennas arranged in the X and Y direction and a positioning device (e.g., an electromagnetic stylus). The position of the electromagnetic stylus can be determined accurately by the electromagnetic inductive touch panel even if the hand or finger is placed on the touch panel.

FIG. 1a is a schematic diagram of an electromagnetic inductive touch panel structure in the prior art. As shown in FIG. 1a, the electromagnetic inductive touch panel includes first coils 11 (including 11-1, 11-2, 11-3 ... 11-48) arranged in the X direction and extending in the Y direction and second coils 12 (including 12-1, 12-2, 12-3 ... 12-48) arranged in the Y direction and extending in the X direction, where typically the first coils 11 intersect with and are insulated from the second coils 12, and both the first coils 11 and the second coils 12 are arranged on a substrate (not illustrated). A drive detection method of the touch panel in the prior art will be described with reference to FIG. 1b and FIG. 1c taking the first coils 11 as an example. A drive signal is applied to the respective coils among the first coils 11, and the respective coils emit an electromagnetic signal and then receive an electromagnetic signal (referred to as a reflected signal) reflected by an electromagnetic stylus and generate an inductive signal. Specifically a drive signal is applied to the first coil 11-1 so that the first coil 11-1 emits an electromagnetic signal, and the electromagnetic stylus receives the electromagnetic signal emitted from the first coil 11-1, and a resonant circuit (e.g., an LC resonant circuit) therein resonates to generate and emit an electromagnetic signal (i.e., a reflected signal) at the same frequency as the electromagnetic signal emitted by the first coil 11-1, and the first coil 11-1 receives the electromagnetic signal reflected by the electromagnetic stylus and then generates an inductive signal (which is typically embodied as an inductive voltage); and alike all the first coils 11-2, 11-3, ..., 11-48 generate inductive signals, thus resulting in 48 inductive signals in total. Function fitting (e.g., quadratic function fitting) is performed on these 48 inductive signals, and the position (Xp) of the peak of fitted curve is determined as the coordinate of a touch position of the electromagnetic stylus in the X direction. The coordinate of a touch position of the electromagnetic stylus in the Y direction can be determined similarly.

Although the touch position of the electromagnetic stylus can be well determined in the touch panel and drive detection method thereof described above, it is desirable to improve the efficiency of drive detection thereof.

BRIEF SUMMARY OF THE INVENTION

An embodiment of the invention provides an electromagnetic inductive touch panel for detecting a touch position of an electromagnetic stylus including a first resonant circuit and a second resonant circuit, the electromagnetic inductive touch panel including: a plurality of first coils extending in a first direction and a plurality of second coils extending in a second direction, wherein at least one of the first coils emits a first electromagnetic signal at a first frequency, and the first resonant circuit receives the first electromagnetic signal and then resonates to generate a first reflected signal at the first frequency, and at least one of the second coils emits a second electromagnetic signal at a second frequency, and the second resonant circuit receives the second electromagnetic signal and then resonates to generate a second reflected signal at the second frequency.

Another embodiment of the invention provides a coordinate input apparatus including an electromagnetic stylus and the electromagnetic inductive touch panel described above, the electromagnetic stylus including a first resonant circuit and a second resonant circuit.

Another embodiment of the invention provides a drive detection method of an electromagnetic inductive touch panel to detect a touch position of an electromagnetic stylus including a first resonant circuit and a second resonant circuit, the electromagnetic inductive touch panel including a plurality of first coils extending in a first direction and a plurality of second coils extending in a second direction, wherein the drive detection method includes: applying a first drive signal to at least one of the first coils to make it emit a first electromagnetic signal at a first frequency so that the first resonant circuit receives the first electromagnetic signal and then resonates to generate a first reflected signal at the first frequency; and applying a second drive signal to at least one of the second coils to make it emit a second electromagnetic signal at a second frequency so that the second resonant circuit receives the second electromagnetic signal and then resonates to generate a second reflected signal at the second frequency.

BRIEF DESCRIPTION OF THE DRAWINGS

FIG. 1b is a schematic principle diagram of drive detection of first coils in FIG. 1a;

FIG. 12 is a flow chart of a drive detection method according to an embodiment of the invention;

FIG. 13 is a flow chart of a drive detection method involving preliminary detection and precise detection according to an embodiment of the invention; and FIG. 14 is a schematic diagram of a coordinate input apparatus structure according to an embodiment of the invention.

DETAILED DESCRIPTION OF THE INVENTION

The present invention relates to the field of electromagnetic inductive touch technologies and particularly to an electromagnetic inductive touch panel, a drive detection method of the electromagnetic inductive touch panel and a coordinate input apparatus including the electromagnetic inductive touch panel.

One of the core ideas of the invention lies in detecting a touch position of an electromagnetic stylus on an electromagnetic inductive touch panel by using electromagnetic signals at two frequencies and corresponding resonant circuits at the two frequencies in the electromagnetic stylus. Thus the electromagnetic signals at the different frequencies are used respectively for drive direction in the X direction and drive direction in the Y direction, both of which can be performed concurrently to thereby speed up detecting the touch position of the electromagnetic stylus on the electromagnetic inductive touch panel and improve the efficiency of detection.

Figure 2A:
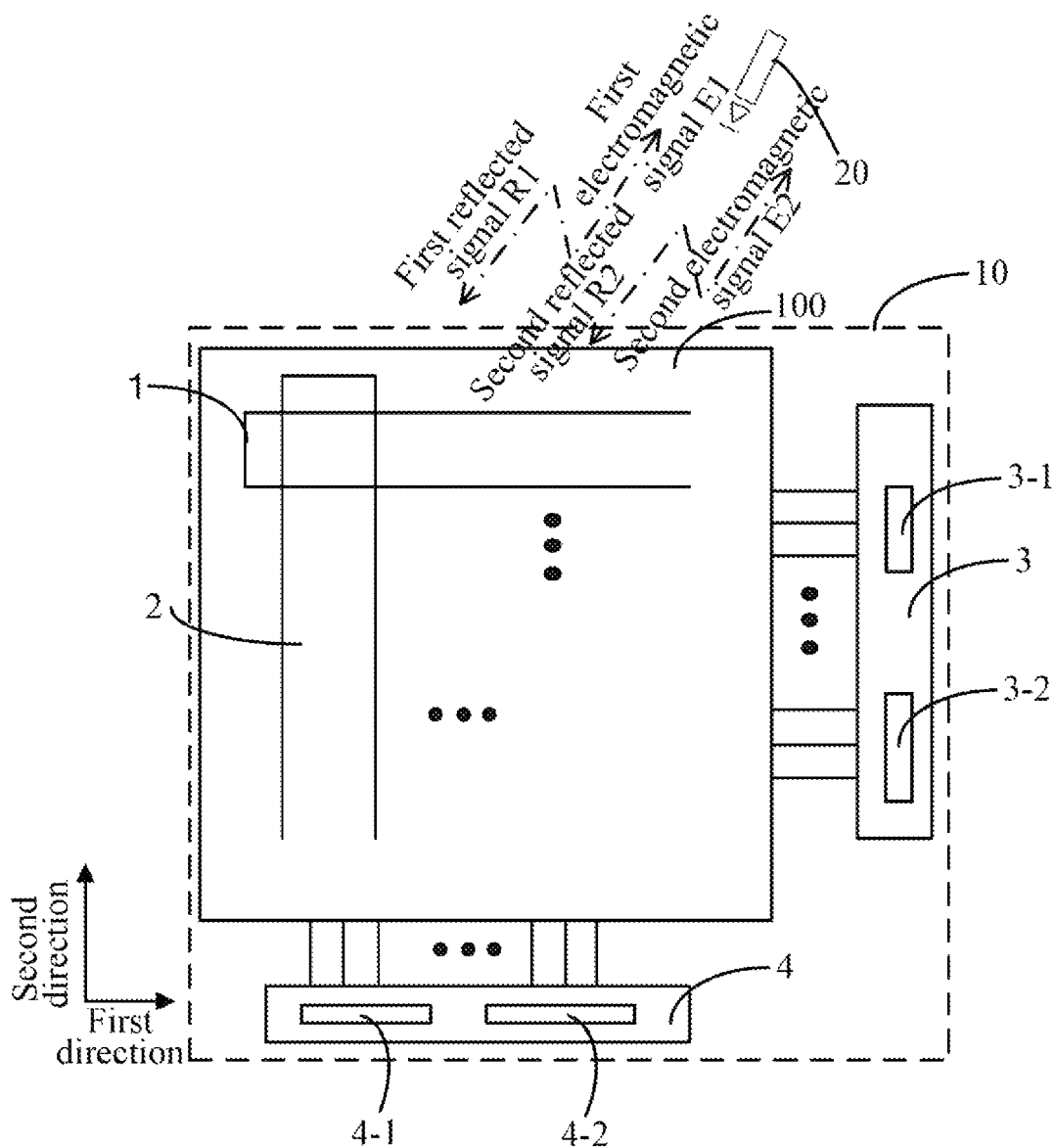
FIG. 2a is a block diagram of a coordinate input device structure according to an embodiment of the invention.

FIG. 2a illustrates a block diagram of a coordinate input device structure according to an embodiment of the invention. As shown in FIG. 2a, the coordinate input device includes an electromagnetic inductive touch panel 10 and an electromagnetic stylus 20. The electromagnetic inductive touch panel 10 generally includes: a first substrate 100; a plurality of first coils 1 extending in a first direction (e.g., the X direction), and a plurality of second coils 2 extending in a second direction (e.g., the Y direction), located on the first substrate 100; and a Y-direction drive detection circuit 3 and an X-direction drive detection circuit 4 electrically connected with the first coils 1 and the second coils 2, where the plurality of first coils 1 are arranged in the second direction, and the plurality of second coils 2 are arranged in the first direction; and both the first coils 1 and the second coils 2 can be U-shaped coils as illustrated, and both of them are insulated from and intersect with each other.

Figure 2B:
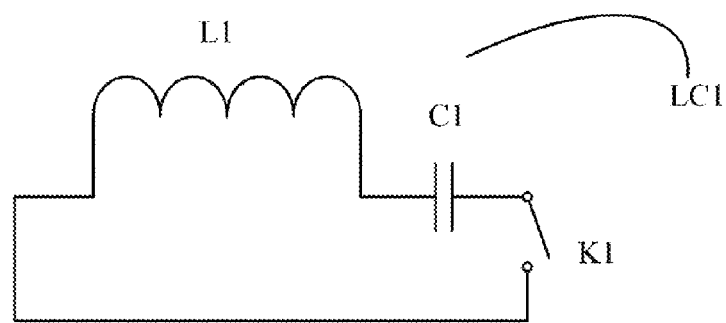
FIG. 2b is a schematic diagram of a resonant circuit structure in an electromagnetic stylus according to an embodiment of the invention.
Figure 2B:
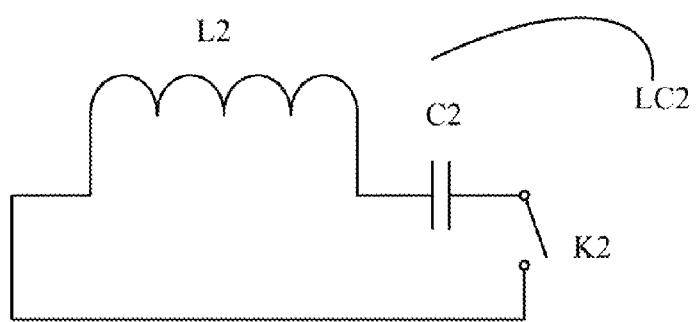

Typically the electromagnetic stylus 20 is passive, that is, provided without any extra power supply. As illustrated in FIG. 2b, the electromagnetic stylus 20 includes a first resonant circuit LC1 and a second resonant circuit LC2, where the first resonant circuit LC1 includes an inductor L1, a capacitor C1 and a switch K1 connected in series forming a closed loop, i.e., an LC resonant circuit; and the second resonant circuit LC2 includes an inductor L2, a capacitor C2 and a switch K2 connected in series forming a closed loop, i.e., an LC resonant circuit. When the electromagnetic inductive touch panel 10 is pressed by the tip of the electromagnetic stylus 20 (not illustrated), the switches K1 and K2 are on, and the first resonant circuit LC1 and the second resonant circuit LC2 are operative; and when the electromagnetic inductive touch panel 10 is not pressed by the tip of the electromagnetic stylus 20 (not illustrated), the switches K1 and K2 are off, and the first resonant circuit LC1 and the second resonant circuit LC2 are inoperative. Moreover a switch can be shared by the switches K1 and K2.

An embodiment will be described below showing drive detection process in the electromagnetic inductive touch panel 10 to determine a touch position of the electromagnetic stylus 20 when the first resonant circuit LC1 and the second resonant circuit LC2 are operative. Generally there can be two processes which are: 1) an emission and reflection process; and 2) a reception process respectively.

1) Emission and Reflection Process

1a) In the emission and reflection process of the first coils, at least one first coil 1 (assumed there are G1 first coils 1, where G1 is an integer larger than or equal to 1) emits a first electromagnetic E1 at a first frequency f1, and the first resonant circuit LC1 receives the first electromagnetic E1 and then resonates to generate a first reflected signal R1 at the same frequency (i.e. the first frequency f1). As illustrated in FIG. 2a, the Y-direction drive detection circuit 3 can further include a first drive circuit 3-1 which provides the G1 first coils 1 with a first drive signal D1 to make them emit a first electromagnetic signal E1 at a first frequency f1. The first resonant circuit LC1 receives the first electromagnetic signal E1 and then is excited to generate an electromagnetic signal at the first frequency as the first electromagnetic signal E1 emitted by the first coil 1 (the process in which the electromagnetic stylus receives the electromagnetic signal and then resonates to generate the electromagnetic signal at the first frequency is often referred to as "the electromagnetic stylus reflecting the electromagnetic signal", and the electromagnetic signal emitted by the electromagnetic stylus is often referred to as a reflected signal).

1b) In the emission and reflection process of the second coils, at least one second coil 2 (assumed there are G2 second coils 2, where G2 is an integer larger than or equal to 1) emits a second electromagnetic E2 at a second frequency f2, and the second resonant circuit LC2 receives the second electromagnetic E2 and then resonates to generate a second reflected signal R2 at the same frequency (i.e. the second frequency f2). As illustrated in FIG. 2a, the X-direction drive detection circuit 4 can further include a second drive circuit 4-1 which provides the G2 second coils 2 with a second drive signal D2 to make them emit a second electromagnetic signal E2 at a second frequency f2. The second resonant circuit LC2 receives the second electromagnetic signal E2 and then is excited to generate an electromagnetic signal at the second frequency as the second electromagnetic signal E2 emitted by the second coil 2, i.e., a reflected signal R2).

In a preferred implementation, the process described above in which the at least one first coil 1 emits the first electromagnetic signal E1 at the first frequency f1 and the first resonant circuit LC1 receives the first electromagnetic E1 and then resonates to generate the first reflected signal R1 at the same frequency (i.e. the first frequency f1) can be performed synchronously or concurrently (to thereby improve the efficiency of detection) or asynchronously with the process in which the at least one second coil 2 emits the second electromagnetic E2 at the second frequency f2, and the second resonant circuit LC2 receives the second electromagnetic E2 and then resonates to generate the second reflected signal R2 at the same frequency (i.e. the second frequency f2). The first frequency f1 is not equal to the second frequency f2.

2) Reception Process

The reception process can be implemented differently, for example:

First Implementation:

2a) In the reception process of the first coils, a plurality of first coils 1 (assumed there are H1 first coils, where H1 is an integer larger than or equal to 2) receive the first reflected signal R1 and generate first inductive signals S1.

2b) In the reception process of the second coils, a plurality of second coils 2 (assumed there are H2 second coils, where H2 is an integer larger than or equal to 2) receive the second reflected signal R2 and generate second inductive signals S2.

Typically, as illustrated in FIG. 2a, the Y-direction drive detection circuit 3 can further include a first detection circuit 3-2 which detects the first inductive signals S1 from the H1 first coils 1 and determines the coordinate value of the touch position of the electromagnetic stylus 20 in the second direction (the Y direction) from the first inductive signals S1. The X-direction drive detection circuit 4 can further include a second detection circuit 4-2 which detects the second inductive signals S2 from the H2 second coils 2 and determines the coordinate value of the touch position of the electromagnetic stylus 20 in the first direction (the X direction) from the second inductive signals S2.

Second Implementation:

2a) In the reception process of the first coils, a plurality of the first coils 1 (assumed there are H1 first coils, where H1 is an integer larger than or equal to 2) receive the second reflected signal R2 and generate first inductive signals S1.

2b) In the reception process of the second coils, a plurality of the second coils 2 (assumed there are H2 second coils, where H2 is an integer larger than or equal to 2) receive the first reflected signal R1 and generate second inductive signals S2.

Typically, as illustrated in FIG. 2a, the Y-direction drive detection circuit 3 can further include a first detection circuit 3-2 which detects the first inductive signals S1 from the plurality of first coils 1 and determines the coordinate value of the touch position of the electromagnetic stylus 20 in the second direction (the Y direction) from the first inductive signals S1. The X-direction drive detection circuit 4 can further include a second detection circuit 4-2 which detects the second inductive signals S2 from the plurality of second coils 2 and determines the coordinate value of the touch position of the electromagnetic stylus 20 in the first direction (the X direction) from the second inductive signals S2. The first inductive signals S1 and the second inductive signals S2 can be inductive currents or inductive voltages.

The coils to emit the electromagnetic signals in the 1) emission and reflection process can be selected differently, and the coils to receive the reflected signals in the corresponding 2) reception process and the reflected signals received by the coils can be selected differently. Each selection corresponds to a particular drive detection method, and a plurality of selections can be combined with each other to accommodate different applications. Correspondingly the first drive detection circuit 3 (including the first drive circuit 3-1 and the first detection circuit 3-2) and the second drive detection circuit 4 (including the second drive circuit 4-1 and the second detection circuit 4-2) can be electrically connected with the first coils 1 and the second coils 2 particularly differently as the particular drive detection method varies. The following description will be given of particular embodiments thereof.

Figure 2C:
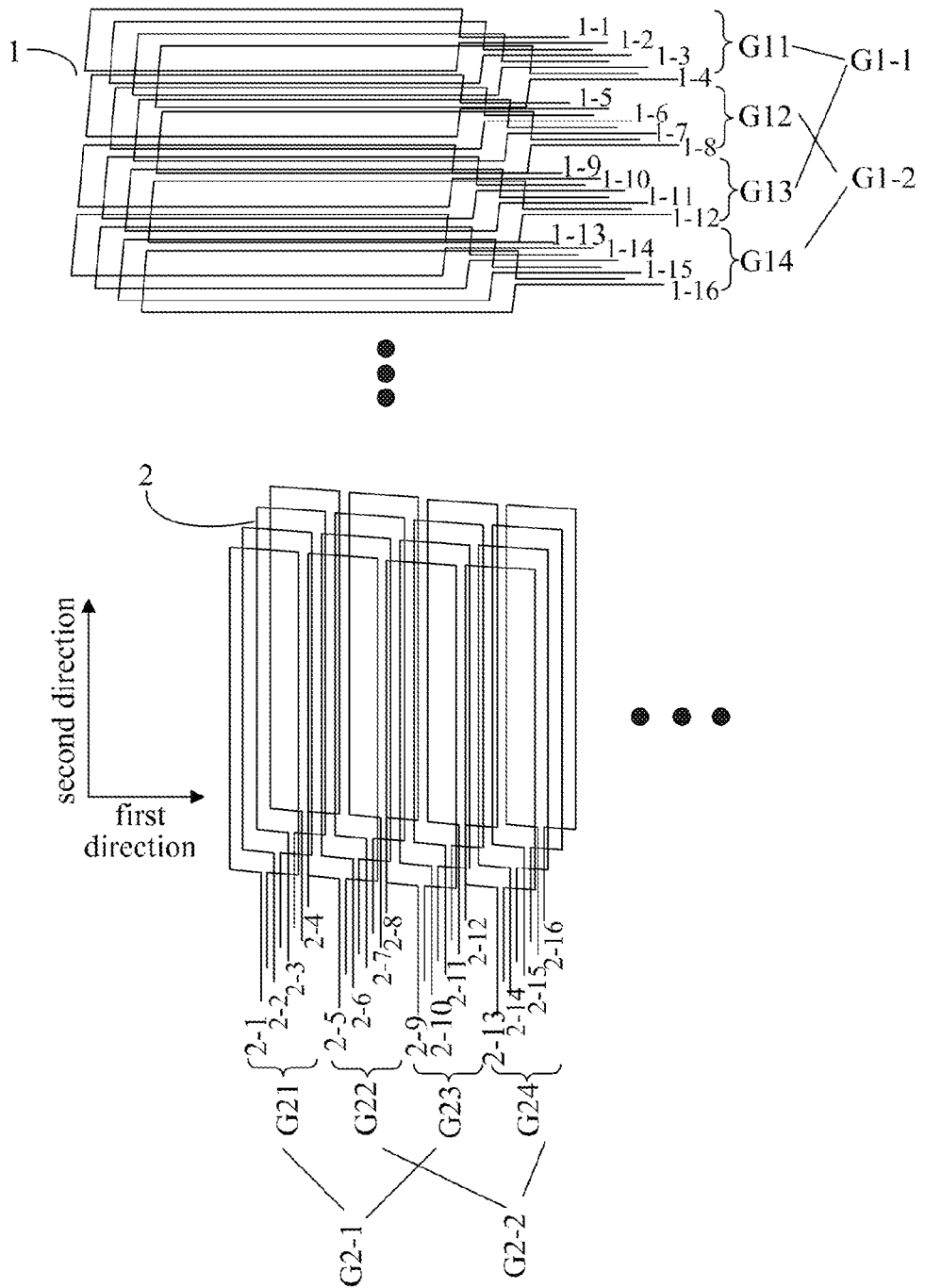
FIG. 2c is a schematic diagram of a layout structure of first coils and second coils of an electromagnetic inductive touch panel according to an embodiment of the invention.

FIG. 2c is a schematic diagram of a layout structure of first coils and second coils of an electromagnetic inductive touch panel according to another embodiment of the invention. An operation process of the electromagnetic inductive touch panel according to the present embodiment will be described below with reference to FIG. 2a, FIG. 2b and FIG. 2c.

As shown in FIG. 2c, in the electromagnetic inductive touch panel 10, first coils 1 includes a plurality of coils 1-1, 1-2, 1-3, . . . , extending in a first direction (e.g., the X direction), arranged in a second direction (e.g., the Y direction); and second coils 2 includes a plurality of coils 2-1, 2-2, 2-3, . . . , extending in the second direction (e.g., the Y direction), arranged in the first direction (e.g., the X direction). Typically the first coils 1 intersect (preferably perpendicularly) with and are insulated from the second coils, that is, the first direction intersects (preferably perpendicularly) with the second direction. It shall be noted that FIG. 2c illustrates that adjacent ones of the first coils 1-1, 1-2, 1-3, . . . , are arranged overlapping and adjacent ones of the second coils 2-1, 2-2, 2-3, . . . , are arranged overlapping by way of an example, but alternatively the adjacent ones of the first coils 1-1, 1-2, 1-3, . . . , may not be arranged overlapping and the adjacent ones of the second coils 2-1, 2-2, 2-3, . . . , may not be arranged overlapping either. The first coils 1 and the second coils 2 are typically U-shaped coils.

As shown in FIG. 2c, the first coils 1 in the electromagnetic inductive touch panel 10 include a plurality of groups of first coils G11, G12, G13, . . . , each of which includes at least one first coil. It shall be noted that FIG. 2c illustrates that G11 (including first coils 1-1, 1-2, 1-3 and 1-4), G12 (including first coils 1-5, 1-6, 1-7 and 1-8), G13 (including first coils 1-9, 1-10, 1-11 and 1-12) and G14 (including first coils 1-13, 1-14, 1-15 and 1-16) each include four coils by way of an example, but those ordinarily skilled in the art can appreciate that the respective groups of first coils can at least include only one first coil or can include a plurality of first coils; and the numbers of first coils included in the respective groups may or may not be the same. Moreover the plurality of groups of first coils G11, G12, G13, . . . are grouped into a first set of first coils G1-1 and a second set of first coils G1-2, and the respective groups of first coils G11, G13, . . . , in the first set of first coils G1-1 are arranged alternating with the respective groups of first coils G12, G14, . . . , in the second set of first coils G1-2, that is, G11, G12, G13, G14, . . . , are arranged sequentially. FIG. 2c illustrate that the first set of first coils G1-1 is an odd set, that is, includes G11, G13, . . . ; and the second set of first coils G1-2 is an even set, that is, includes G12, G14, . . . , by way of an example, but alternatively the first set of first coils G1-1 can be an even set, that is, includes G12, G14, . . . ; and the second set of first coils G1-2 can be an odd set, that is, includes G11, G13, . . . . The other embodiments in the specification of this application will also be described by way of an example where the first set of first coils G1-1 is an odd set and the second set of first coils G1-2 is an even set.

Similarly the second coils 2 include a plurality of groups of second coils G21, G22, G23, . . . , each of which includes at least one second coil. It shall be noted that FIG. 2c illustrates that G21 (including second coils 2-1, 2-2, 2-3 and 2-4), G22 (including second coils 2-5, 2-6, 2-7 and 2-8), G23 (including second coils 2-9, 2-10, 2-11 and 2-12) and G24 (including second coils 2-13, 2-14, 2-15 and 2-16) each include four coils by way of an example, but those ordinarily skilled in the art can appreciate that the respective groups of second coils can include only one second coil or can include a plurality of second coils; and the numbers of second coils included in the respective groups may or may not be the same. Moreover the plurality of groups of second coils G21, G22, G23, . . . are grouped into a first set of second coils G2-1 and a second set of second coils G2-2, and the respective groups of second coils G21, G23, . . . , in the first set of second coils G2-1 are arranged alternating with the respective groups of second coils G22, G24, . . . , in the second set of second coils G2-2. FIG. 2c illustrate that the first set of second coils G2-1 is an odd set, that is, includes G21, G23, . . . ; and the second set of second coils G2-2 is an even set, that is, includes G22, G24, . . . , by way of an example, but alternatively the first set of second coils G2-1 can be an even set, that is, includes G22, G24, . . . ; and the second set of second coils G2-2 can be an odd set, that is, includes G21, G23, . . . . The other embodiments in the specification of this application will also be described by way of an example where the first set of second coils G2-1 is an odd set and the second set of second coils G2-2 is an even set.

A drive detection process of the electromagnetic inductive touch panel illustrated will be described below by way of an example where the layout of the first coils and the second coils is as illustrated in FIG. 2c. The drive detection process generally includes preliminary detection and particularly second-direction coordinate preliminary detection (P1) and first-direction coordinate preliminary detection (P2).

P1.1: The second-direction coordinate preliminary detection (P1) can be performed as follows, that is, 1) in an emission and reflection process, the first set of first coils emit electromagnetic signals, and the first resonant circuit LC1 generates a reflected signal, and 2) in a reception process, the second set of first coils receives the reflected signal and generates inductive signals (in correspondence to the first implementation described above).

Figure 3:
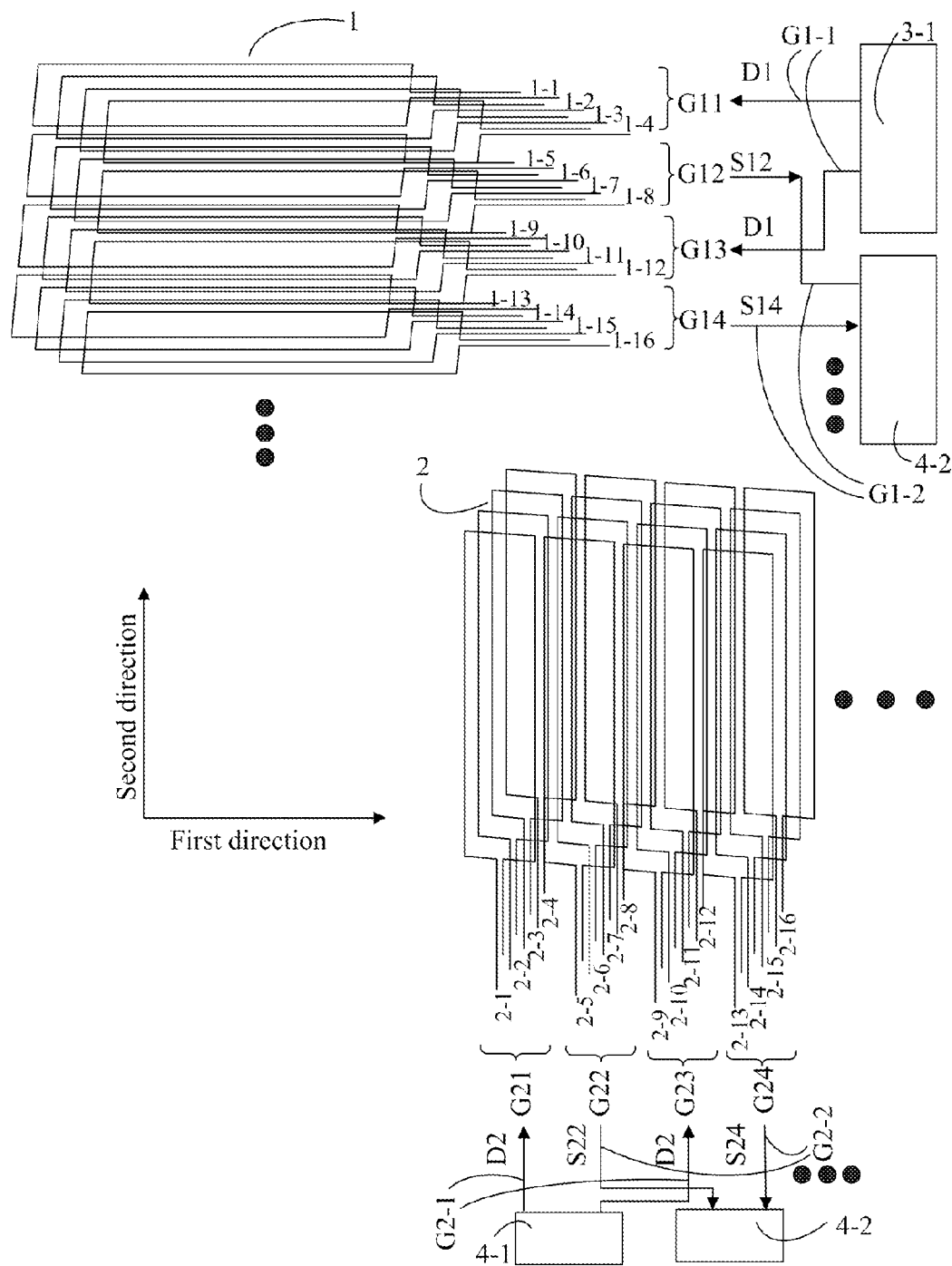
FIG. 3 is a principle diagram of preliminary detection according to an embodiment of the invention.

As illustrated in FIG. 3, a drive signal D1 is applied concurrently to the first set of first coils G1-1 (i.e., G1 first coils) to make them emit electromagnetic signals, first inductive signals S1 (including S12, S14, . . . ) are detected from the respective second set of first coils G1-2 (i.e., H1 first coils), and a preliminary value of the coordinate of a touch position of the electromagnetic stylus in the second direction are determined from the first inductive signals S1.

1. In the emission and reflection process of the first coils, the respective groups of first coils (G11, G13, . . . ) in the first set of first coils G1-1 receive the first drive signal D1 from the first drive circuit 3-1 and emit first electromagnetic signals E1 concurrently. The first resonant circuit LC1 in the electromagnetic stylus 20 resonates to generate a first reflected signal R1. Here the respective groups of first coils in the first set of first coils G1-1 are the at least one first coil as referred to in the 1) emission and reception process described above.

2. In the reception process of the first coils, the respective groups of first coils (G12, G14, . . . ) in the second set of first coils G1-2 receive (concurrently or group by group) the first reflected signal R1 and generate first inductive signals S1. The first detection circuit 3-2 detects the respective first inductive signals (S12, S14, . . . ) respectively from the respective groups of first coils (G12, G14, . . . ) in the second set of first coils G1-2 in one-to-one correspondence, for example, the first detection circuit 3-2 detects S12 from G12, S14 from G14 and so on, where the first inductive signals can be detected from the respective groups of first coils (G12, G14, . . . ) in the second set of first coils G1-2 concurrently or can be detected group by group separately in time. The drive signal can be applied to the first set of first coils G1-1, to make them emit the electromagnetic signals, concurrently in time with or separately from the detection of the first inductive signals from the respective second set of first coils G1-2. Here the respective groups of first coils in the second set of first coils G1-2 are the H1 first coils as referred to in the first implementation of the 2) reception process described above.

Figure 4A:
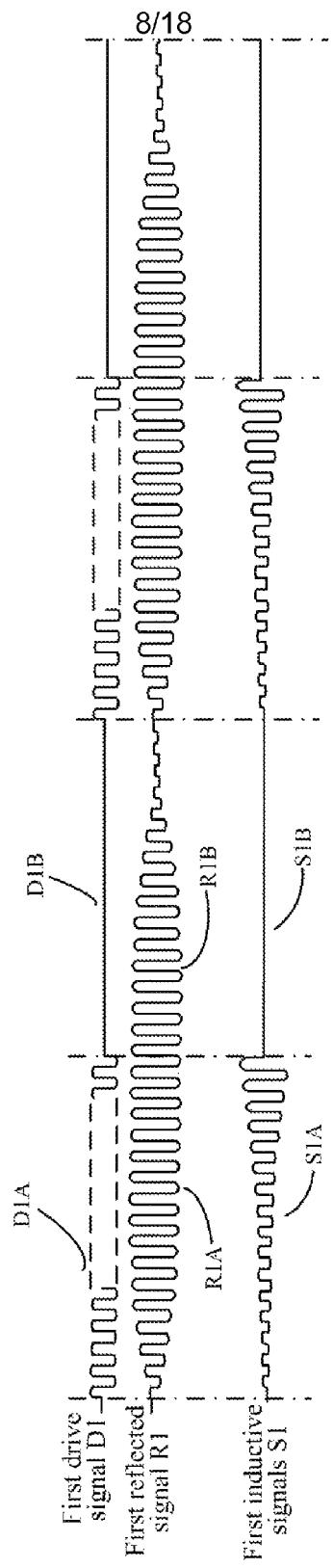
FIG. 4a is respective signal waveform diagrams showing that a first set of first coils emitting electromagnetic signals and a second set of first coils detecting inductive signals occur concurrently according to an embodiment of the invention.

If the drive signal is applied to the first set of first coils G1-1, to make them emit the electromagnetic signals, concurrently in time with the detection of the first inductive signals from the respective second set of first coils G1-2, then the detected inductive signals need to be processed. As illustrated in FIG. 4a, a first drive signal D1 (D1A) is applied (by the first drive circuit 3-1) to the first set of first coils G1-1, where the first drive signal D1 can be applied once or can be applied repeatedly at an interval of time (D1B). The electromagnetic stylus generates a strength-increasing segment R1A of the first reflected signal R1 when the first drive signal D1 (D1A) is applied (by the first drive circuit 3-1) to the first set of first coils G1-1; and generates a strength-decreasing segment R1B of the first reflected signal R1 when the first drive signal D1 (D1B) is not applied (by the first drive circuit 3-1) to the first set of first coils G1-1. When the first drive signal D1 (D1A) is applied (by the first drive circuit 3-1) to the first set of first coils G1-1, first segments S1A of the detected (by the first drive circuit 3-1) first inductive signals S1 of the second set of first coils G1-2 result from both D1A and R1A. In order to improve the accuracy of detection, inductive signals S1A' generated by the second set of first coils G1-2 separately by the first drive signal D1 need to be detected in advance, and then during operation of the electromagnetic inductive touch panel, S1A' are removed from the inductive signals S1A detected from the second set of first coils G1-2, when the drive signal is applied to the first set of first coils G1-1, to derive inductive signals generated by the second set of first coils G1-2 being excited by the electromagnetic signal emitted by the electromagnetic stylus.

Figure 4B:
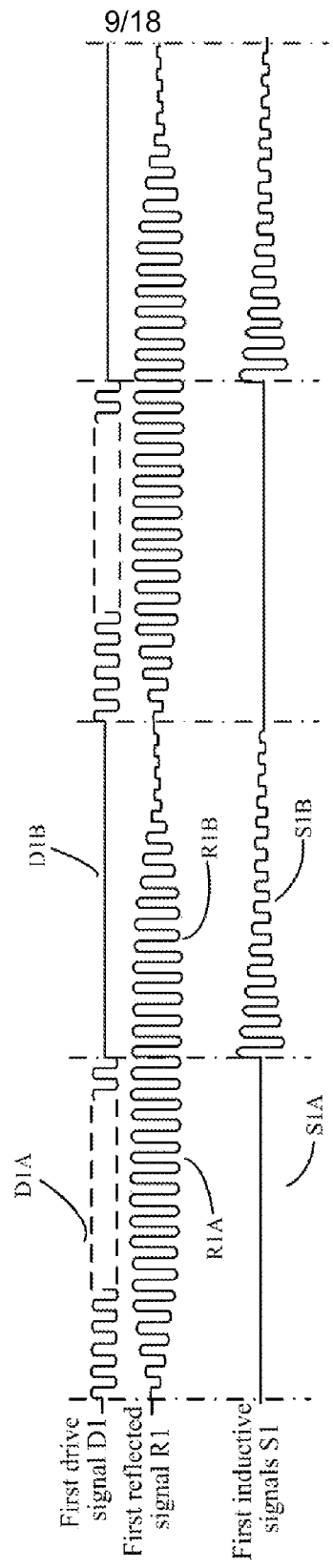
FIG. 4b is respective signal waveform diagrams showing that a first set of first coils emitting electromagnetic signals and a second set of first coils detecting inductive signals occur in time division according to an embodiment of the invention.

If the drive signal is applied to the first set of first coils G1-1, to make them emit the electromagnetic signals, separately in time from the detection of the first inductive signals from the respective second set of first coils G1-2, then the drive circuit also needs to be adapted or the detected inductive signals need to be processed. As illustrated in FIG. 4b, a first drive signal D1 (D1A) is applied (by the first drive circuit 3-1) to the first set of first coils G1-1, where the first drive signal D1 can be applied once or can be applied repeatedly during an interval of time (D1B). The electromagnetic stylus generates a strength-increasing segment R1A of the first reflected signal R1 when the first drive signal D1 (D1A) is applied (by the first drive circuit 3-1) to the first set of first coils G1-1; and generates a strength-decreasing segment R1B of the first reflected signal R1 when the first drive signal D1 (D1B) is not applied (by the first drive circuit 3-1) to the first set of first coils G1-1. When the first drive signal D1 (D1B) is not applied (by the first drive circuit 3-1) to the first set of first coils G1-1, detected (by the first drive circuit 3-1) inductive signals S1B of the second set of first coils G1-2 result from the excitation by the reflected signal R1B emitted by the electromagnetic stylus. In FIG. 4b, when the first drive signal D1 (D1A) is applied (by the first drive circuit 3-1) to the first set of first coils G1-1, inductive signals S1A detected from the second set of first coils G1-2 are zero. In fact, however, here the second set of first coils G1-2 will be acted on by D1A and R1A to generate the electromagnetic inductive signals S1A as illustrated in FIG. 4a. However the inductive signals S1A in this period of time do not result from the electromagnetic signal reflected by the electromagnetic stylus alone, so the drive circuit can be modified structurally or the inductive signals detected in this period of time can be filtered out.

Figure 5A:
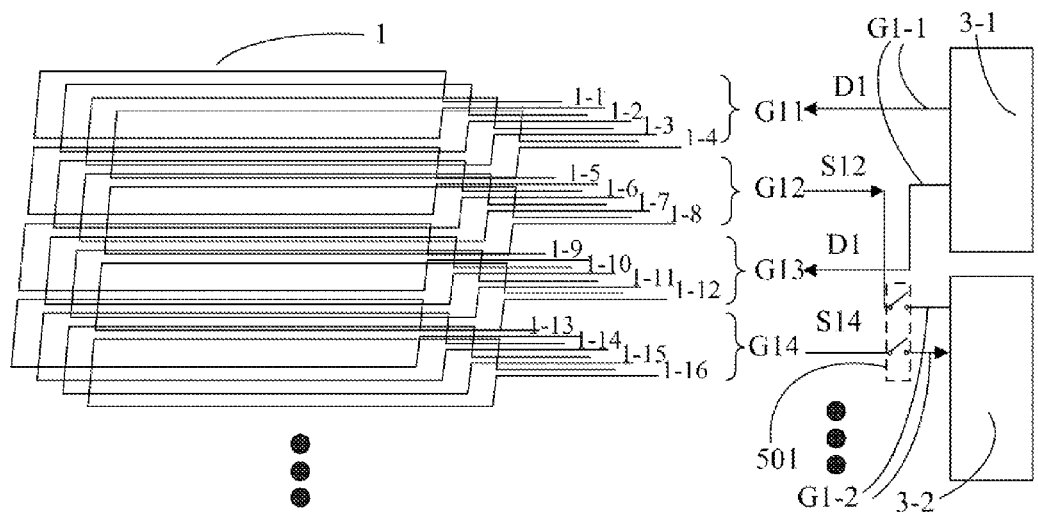
FIG. 5a is a principle diagram of preliminary detection in a second direction using a first selection switch element according to an embodiment of the invention.

As illustrated in FIG. 5a, a first selection switch element 501 is added to the electromagnetic inductive touch panel in FIG. 3 to control a period of time in which the first detection circuit 3-2 detects the inductive signals from the second set of first coils G1-2. Components similar to those in FIG. 3 will not be described again, and as shown in FIG. 5a, the electromagnetic inductive touch panel further includes the first selection switch element 501 arranged between the second set of first coils G1-2 and the first detection circuit 3-2 to be off when the first set of first coils G1-1 emit the electromagnetic signals and to be on when the first set of first coils G1-1 emit no electromagnetic signals. The first selection switch element 501 can include a plurality of switches, each of which is electrically connected with one of the groups of first coils in the second set of first coils G1-2; and these switches can be on/off concurrently or can be on sequentially.

Figure 5B:
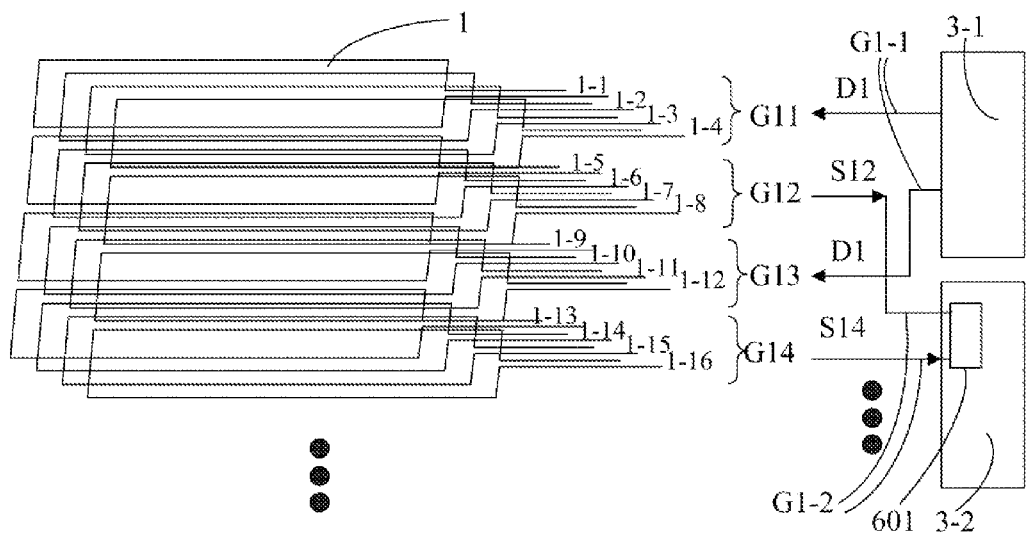
FIG. 5b is a principle diagram of preliminary detection in a second direction using a first signal filter element according to an embodiment of the invention.

As illustrated in FIG. 5b, a first signal filter element 601 is added to the first detection circuit 3-2 of the electromagnetic inductive touch panel in FIG. 3. Components similar to those in FIG. 3 will not be described again, and as shown in FIG. 5b, the first detection circuit 3-2 further includes the first signal filter element 601 to filter out the inductive signal detected from the second set of first coils G1-2 when the first set of first coils G1-1 emitting the electromagnetic signals.

Figure 6:
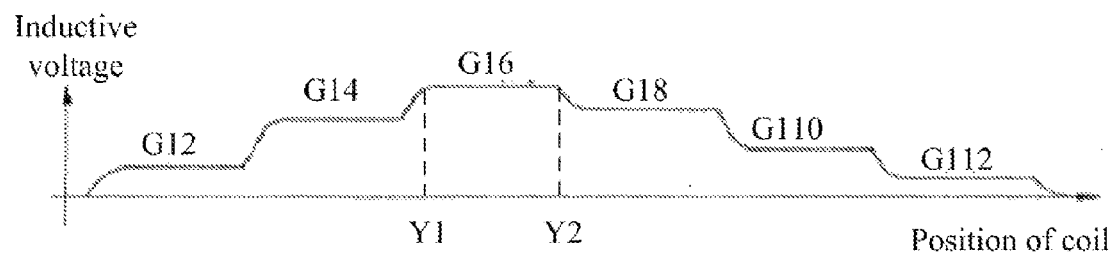
FIG. 6 is a diagram plotting inductive voltages detected from the respective second set of first coils in FIG. 3.

Moreover the first detection circuit 3-2 can determine the preliminary value of the coordinate of the touch position of the electromagnetic stylus in the second direction from the first inductive signals S1 in various particular implementations, one of which will be described below with reference to FIG. 6. As illustrated in FIG. 6, the first detection circuit 3-2 detects a first inductive signal (an inductive voltage as illustrated) from each of the groups of first coil in the second set of first coils G1-2. The first detection circuit 3-2 selects the position of the group of first coils in the second set of first coils corresponding to the largest one of these first inductive signals as the preliminary value of the coordinate of the touch position of the electromagnetic stylus in the second direction. For example, as illustrated, the largest one of the first inductive signals corresponds to the G16 group in the second set of first coils G1-2, so the position of the G16 group is determined as the preliminary value of the coordinate of the touch position of the electromagnetic stylus in the second direction. The position of the G16 group refers to the position of the group arranged in the second direction, which can be the range of coordinates Y1 to Y2 occupied by the group in the second direction or can be a value in the range of coordinates Y1 to Y2, e.g., (Y1+Y2)/2.

With the P1.1 process described above, a rough position of the touch position of the electromagnetic stylus in the second direction can be determined rapidly at least with only one emission of the electromagnetic signals and one reception of the electromagnetic signals.

When preliminary detection of the coordinate in the second direction is performed in the P1.1 process described above, preliminary detection of the coordinate in the first direction can be performed correspondingly in the following process (P1.2), that is, 1) in an emission and reflection process, the second set of first coils emit electromagnetic signals, and the second resonant circuit LC2 generates a reflected signal, and 2) in a reception process, the second set of second coils receives the reflected signal and generates inductive signals (in correspondence to the first implementation described above).

A principle and an operation mode of preliminary detection of the coordinate in the first direction can be the same as the principle and the operation mode of preliminary detection of the coordinate in the second direction except that here the electromagnetic signals are emitted by the first set of second coils, the reflected signal is generated by the second resonant circuit LC2, and the reflected signal is received and the inductive signals are generated by the second set of second coils. Thus reference can be made to the description of P1.1 for particular steps of P2.1. P2.1 will be described briefly below.

As illustrated in FIG. 3, a drive signal D2 is applied concurrently to the first set of second coils G2-1 (i.e., G2 second coils) to make them emit electromagnetic signals, second inductive signals S2 (including S22, S24, ... ) are detected from the respective second set of second coils G2-2 (i.e., H2 first coils), and a preliminary value of the coordinate of the touch position of the electromagnetic stylus in the first direction are determined from the second inductive signals S2.

1. In the emission and reflection process of the second coils, the respective groups of second coils (G21, G23, ...) in the first set of second coils G2-1 receive the second drive signal D2 from the second drive circuit 4-1 and emit second electromagnetic signals E2 concurrently. The second resonant circuit LC2 in the electromagnetic stylus 20 resonates to generate a second reflected signal R2.

2. In the reception process of the second coils, the respective groups of second coils (G22, G24, ... ) in the second set of second coils G2-2 receive (concurrently or group by group) the second reflected signal R2 and generate second inductive signals S2. The second detection circuit 4-2 detects the respective second inductive signals (S22, S24, ... ) respectively from the respective groups of second coils (G22, G24, ...) in the second set of second coils G2-2 in one-to-one correspondence, for example, the second detection circuit 4-2 detects S22 from G22, S24 from G24 and so on, where the second inductive signals can be detected from the respective groups of second coils (G22, G24, ... ) in the second set of second coils G2-2 concurrently or can be detected group by group separately in time. The drive signal can be applied to the first set of second coils G2-1, to make them emit the electromagnetic signals, concurrently in time with or separately from the detection of the second inductive signals from the respective second set of second coils G2-2.

Figure 7A:
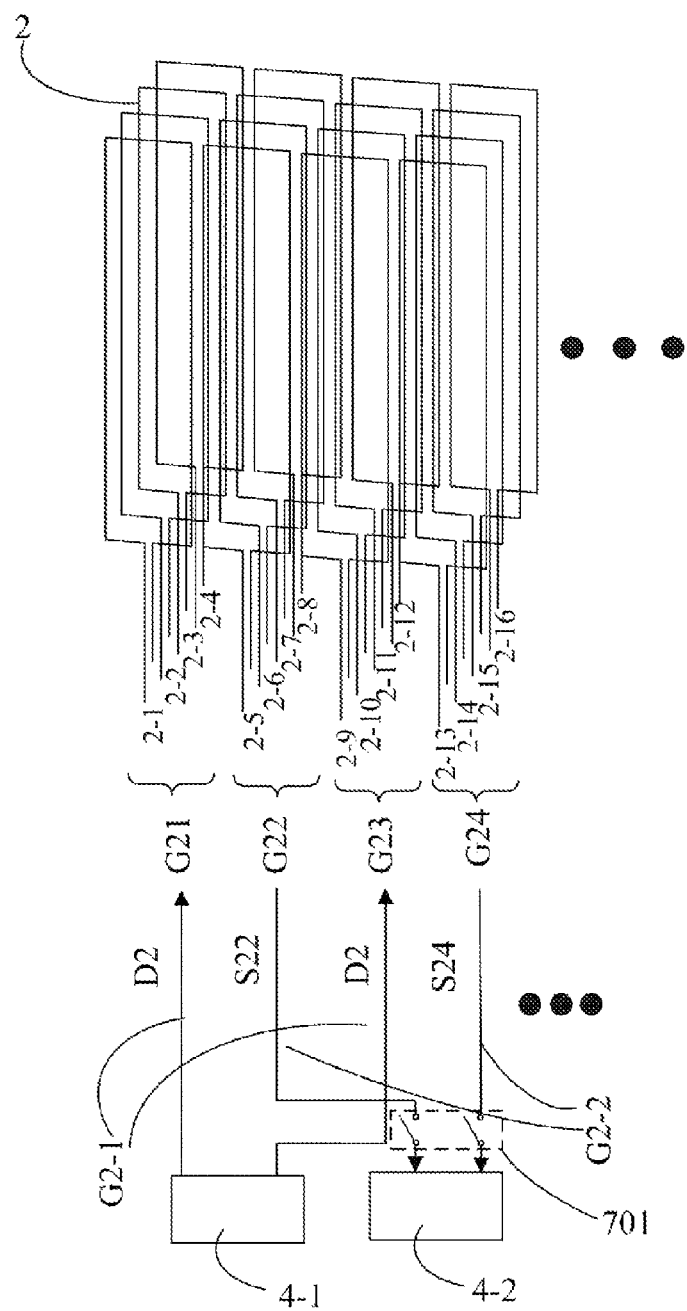
FIG. 7a is a principle diagram of preliminary detection in a first direction using a second selection switch element according to an embodiment of the invention.
Figure 7B:
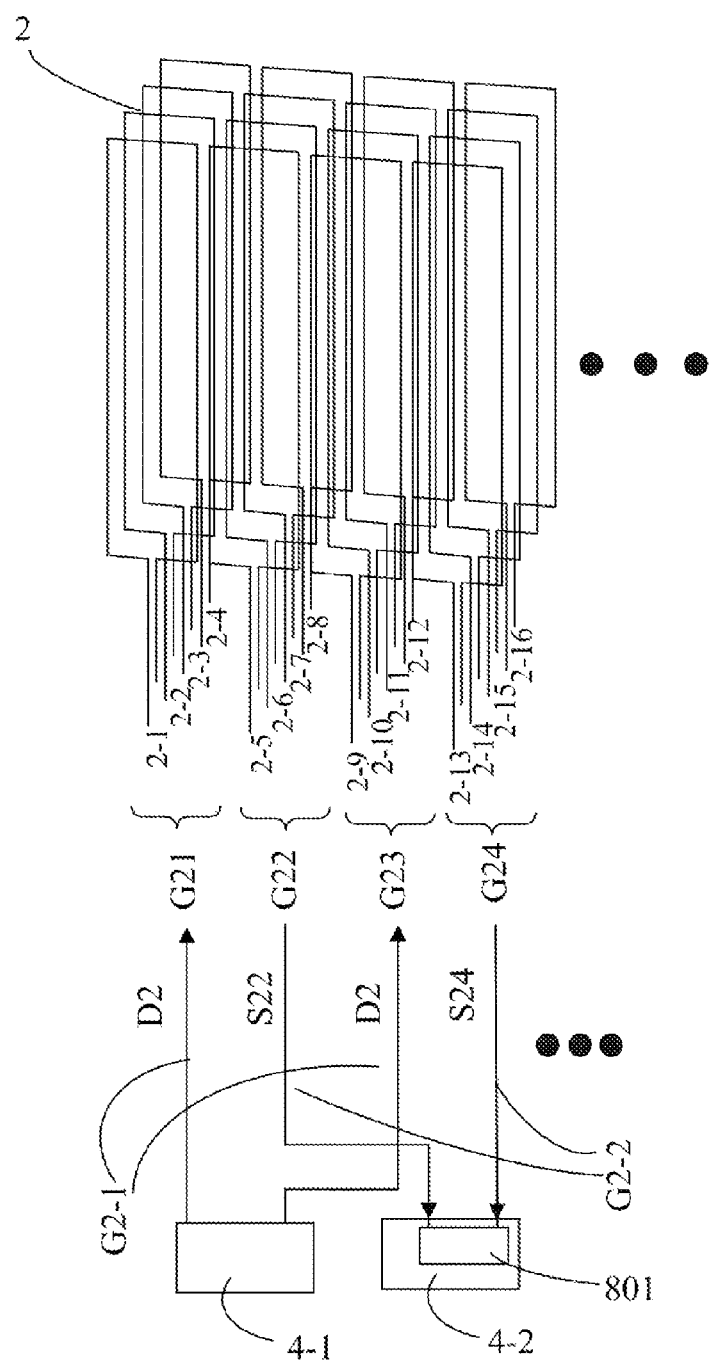
FIG. 7b is a principle diagram of preliminary detection in a first direction using a second signal filter element according to an embodiment of the invention.

If the drive signal is applied to the first set of second coils G2-1, to make them emit the electromagnetic signals, concurrently in time with the detection of the second inductive signals from the respective second set of second coils G2-2, then the detected inductive signals need to be processed. Here the second inductive signals are processed as in the P1.1 process in FIG. 4a and FIG. 4b, so a repeated description thereof will be omitted here. In summary, if the drive signal is applied to the first set of second coils G2-1, to make them emit the electromagnetic signals, concurrently in time with the detection of the second inductive signals from the respective second set of second coils G2-2, then those segments of the detected second signals generated by the first set of second coils G2-1 are removed from the detected signals. If the drive signal is applied to the first set of second coils G2-1, to make them emit the electromagnetic signals, separately in time from the detection of the second inductive signals from the respective second set of second coils G2-2, then a second selection switch element 701 can be added to FIG. 3 (as illustrated in FIG. 7*a*) to control a period of time in which the second detection circuit 4-2 detects the inductive signals from the second set of second coils G2-2; or a second signal filter element 801 can be added to the second detection circuit 4-2 in FIG. 3 (as illustrated in FIG. 7*b*) to filter out the inductive signal detected from the second set of second coils G2-2 when the first set of second coils G2-1 emitting the electromagnetic signals.

Figure 8:
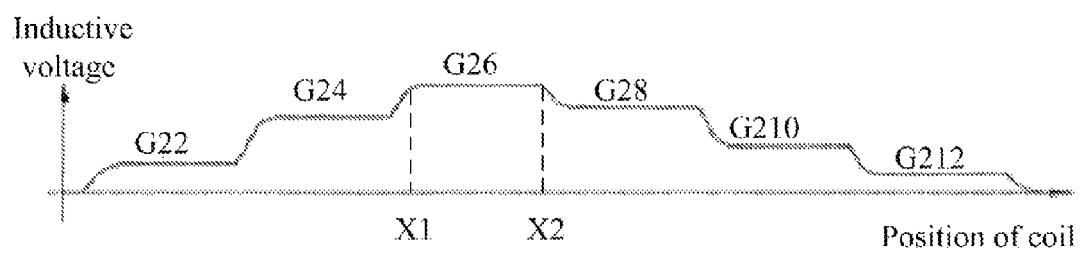
FIG. 8 is a diagram plotting inductive voltages detected from the respective second set of second coils in FIG. 3.

Moreover the second detection circuit 4-2 can determine the preliminary value of the coordinate of the touch position of the electromagnetic stylus in the first direction from the second inductive signals S2 as in the P1.1 process and FIG. 6. One of particular implementations thereof will be described below with reference to FIG. 8. As illustrated in FIG. 8, the second detection circuit 4-2 detects a second inductive signal (an inductive voltage as illustrated) from each of the groups of first coil in the second set of second coils G2-2. The second detection circuit 4-2 selects the position of the group of second coils in the second set of second coils corresponding to the largest one of these second inductive signals as the preliminary value of the coordinate of the touch position of the electromagnetic stylus in the first direction. For example, as illustrated, the largest one of the second inductive signals corresponds to the G26 group in the second set of second coils G2-2, so the position of the G26 group is determined as the preliminary value of the coordinate of the touch position of the electromagnetic stylus in the first direction. The position of the G26 group refers to the position of the group arranged in the first direction, which can be the range of coordinates X1 to X2 occupied by the group in the first direction or can be a value in the range of coordinates X1 to X2, e.g., (X1+X2)/2.

With the P2.1 process described above, a rough position of the touch position of the electromagnetic stylus in the first direction can be determined rapidly at least with only one emission of the electromagnetic signals and one reception of the electromagnetic signals.

Figure 9:
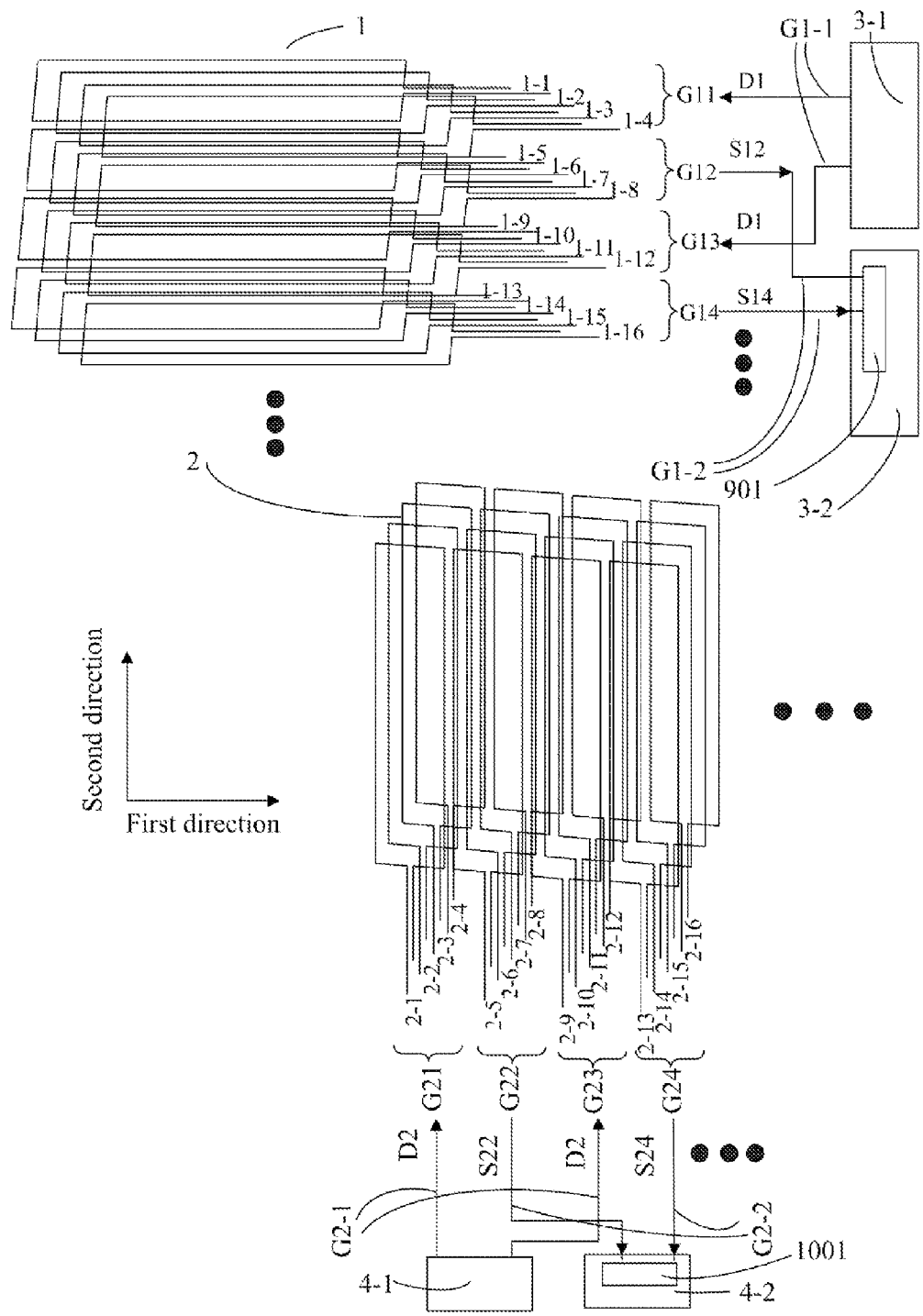
FIG. 9 is a principle diagram of preliminary detection concurrently in a first direction and a second direction according to an embodiment of the invention.

Moreover the P1.1 process to determine the preliminary value of the coordinate in the second direction can be performed synchronously (concurrently) or asynchronously (non-concurrently) with the P2.1 process to determine the preliminary value of the coordinate in the first direction. For an implementation where P1.1 is performed synchronously (concurrently) with P2.1, a third signal filter element 901 can be added to the first detection circuit 3-2 (as illustrated in FIG. 9) to filter out the inductive signals (typically at a second frequency f2) generated by the first coils being induced by the second reflected signal; and alike a fourth signal filter element 1001 can be added to the second detection circuit 4-2 (as illustrated in FIG. 9) to filter out the inductive signals (typically at a first frequency f1) generated by the second coils being induced by the first reflected signal.

The electromagnetic signals are emitted and the electromagnetic signals from the electromagnetic stylus are received by the first coils in P1.1 described above, and the electromagnetic signals are emitted and the electromagnetic signals from the electromagnetic stylus are received by the second coils in P2.1 described above. In an alternative embodiment of the invention, alternatively the electromagnetic signals can be emitted by the first coils and the electromagnetic signals from the electromagnetic stylus can be received by the second coils to determine the coordinate in the first direction, and the electromagnetic signals can be emitted by the second coils and the electromagnetic signals from the electromagnetic stylus can be received by the first coils to determine the coordinate in the second direction.

P1.2: The first-direction coordinate preliminary detection alternatively can be performed as follows, that is, 1) in an emission and reflection process, the first set of first coils (i.e., G1 first coils) emit electromagnetic signals, and the first resonant circuit LC1 generates a reflected signal, and 2) in a reception process, the second set of second coils (i.e., H2 second coils, or the first set of second coils) receives the reflected signal and generates inductive signals (in correspondence to the second implementation described above).

The P1.2 process can be performed using the same principle as and a similar method to the P1.1 process except for their different coils to receive the electromagnetic signals from the electromagnetic stylus. A drive detection process of P1.2 will be also described below with reference to FIGS. 2*a*, 2*b* and 2*c* and FIG. 3.

As illustrated in FIG. 3, a drive signal D1 is applied concurrently to the first set of first coils G1-1 to make them emit electromagnetic signals, second inductive signals S2 (including S22, S24, . . . ) are detected from the respective second set of second coils G2-2, and a preliminary value of the coordinate of a touch position of the electromagnetic stylus in the first direction are determined from the second inductive signals S2.

1. In the emission and reflection process of the first coils, the respective groups of first coils (G11, G13, . . . ) in the first set of first coils G1-1 receive the first drive signal D1 from the first drive circuit 3-1 and emit first electromagnetic signals E1 concurrently. The first resonant circuit LC1 in the electromagnetic stylus 20 resonates to generate a first reflected signal R1. Here the respective groups of first coils in the first set of first coils G1-1 are the G1 first coils as referred to in the 1) emission and reception process described above.

2. In the reception process of the second coils, the respective groups of second coils (G22, G24, . . . ) in the second set of second coils G2-2 receive (concurrently or group by group) the first reflected signal R1 and generate second inductive signals S2. The second detection circuit 4-2 detects the respective second inductive signals (S22, S24, . . . ) respectively from the respective groups of second coils (G22, G24, . . . ) in the second set of second coils G2-2 in one-to-one correspondence, for example, the second detection circuit 4-2 detects S22 from G22, S24 from G24 and so on, where the second inductive signals can be detected from the respective groups of second coils (G22, G24, . . . ) in the second set of second coils G2-2 concurrently or can be detected group by group separately in time. The drive signal can be applied to the first set of second coils G2-1, to make them emit the electromagnetic signals, concurrently in time with or separately from the detection of the second inductive signals from the respective second set of second coils G2-2. Here the respective groups of second coils in the second set of second coils G2-2 are the H2 first coils as referred to in the second implementation of the 2) reception process described above.

If the drive signal is applied to the first set of first coils G1-1, to make them emit the electromagnetic signals, concurrently in time with or separately from the detection of the second inductive signals from the respective second set of second coils G2-2, then the detected inductive signals need to be processed. Here the second inductive signals are processed as in the P2.1, so a repeated description thereof will be omitted here. In summary, if the drive signal is applied to the first set of first coils G1-1, to make them emit the electromagnetic signals, concurrently in time with the detection of the second inductive signals from the respective second set of second coils G2-2, then those segments of the detected second signals generated by the first set of first coils G1-1 are removed from the detected signals. If the drive signal is applied to the first set of first coils G1-1, to make them emit the electromagnetic signals, separately in time from the detection of the second inductive signals from the respective second set of second coils G2-2, then a second selection switch element 701 can be added (as illustrated in FIG. 7a) to control a period of time in which the second detection circuit 4-2 detects the inductive signals from the second set of second coils G2-2; or a second signal filter element 801 can be added to the second detection circuit 4-2 (as illustrated in FIG. 7b) to filter out the inductive signal detected from the second set of second coils G2-2 when the first set of first coils G1-1 emitting the electromagnetic signals.

Moreover the second detection circuit 4-2 can determine the preliminary value of the coordinate of the touch position of the electromagnetic stylus in the first direction from the second inductive signals as in the P2.1 process and FIG. 8, so a repeated description thereof will be omitted here.

With the P1.2 process described above, a rough position of the touch position of the electromagnetic stylus in the first direction can be determined rapidly at least with only one emission of the electromagnetic signals and one reception of the electromagnetic signals.

When preliminary detection of the coordinate in the first direction is performed in the P1.2 process described above, preliminary detection of the coordinate in the second direction can be performed correspondingly in the following process (P2.2), that is, 1) in an emission and reflection process, the first set of second coils (i.e., G2 second coils) emit electromagnetic signals, and the second resonant circuit LC2 generates a reflected signal, and 2) in a reception process, the second set of first coils (i.e., H1 first coils, or the first set of first coils) receives the reflected signal and generates inductive signals (in correspondence to the second implementation described above).

A principle and an operation mode of preliminary detection of the coordinate in the second direction can be the same as the principle and the operation mode of preliminary detection of the coordinate in the first direction except that here the electromagnetic signals are emitted by the first set of second coils, the reflected signal is generated by the second resonant circuit LC2, and the reflected signal is received and the inductive signals are generated by the second set of first coils. Thus reference can be made to the description of P1.2 for particular steps of P2.2. P2.2 will be described briefly below.

As illustrated in FIG. 3, a drive signal D2 is applied concurrently to the first set of second coils G2-1 to make them emit electromagnetic signals, first inductive signals S1 (including S12, S14, . . . ) are detected from the respective second set of first coils G1-2, and a preliminary value of the coordinate of the touch position of the electromagnetic stylus in the second direction are determined from the first inductive signals S1.

1. In the emission and reflection process of the second coils, the respective groups of second coils (G21, G23, . . . ) in the first set of second coils G2-1 receive the second drive signal D2 from the second drive circuit 4-1 and emit second electromagnetic signals E2 concurrently. The second resonant circuit LC2 in the electromagnetic stylus 20 resonates to generate a second reflected signal R2. Here the respective groups of second coils in the first set of second coils G2-1 are the G2 second coils as referred to as in the 1) emission and reflection process described above.

2. In the reception process of the first coils, the respective groups of first coils (G12, G14, . . . ) in the second set of first coils G1-2 receive (concurrently or group by group) the second reflected signal R2 and generate first inductive signals S1. The first detection circuit 3-2 detects the respective first inductive signals (S12, S14, . . . ) respectively from the respective groups of first coils (G12, G14, . . . ) in the second set of first coils G1-2 in one-to-one correspondence, for example, the first detection circuit 3-2 detects S12 from G12, S14 from G14 and so on, where the first inductive signals can be detected from the respective groups of first coils (G12, G14, . . . ) in the second set of first coils G1-2 concurrently or can be detected group by group separately in time. The drive signal can be applied to the first set of first coils G1-1, to make them emit the electromagnetic signals, concurrently in time with or separately from the detection of the first inductive signals from the respective second set of first coils G1-2. Here the respective groups of first coils in the second set of first coils G1-2 are the H1 first coils as referred to as in the second implementation of the 2) reception process described above.

If the drive signal is applied to the first set of second coils G2-1, to make them emit the electromagnetic signals, concurrently in time with or separately from the detection of the first inductive signals from the respective second set of first coils G1-2, then the detected inductive signals need to be processed. Here the first inductive signals are processed as in the P1.1, so a repeated description thereof will be omitted here. In summary, if the drive signal is applied to the first set of second coils G2-1, to make them emit the electromagnetic signals, concurrently in time with the detection of the first inductive signals from the respective second set of first coils G1-2, then those segments of the detected first signals generated by the first set of second coils G2-1 are removed from the detected signals. If the drive signal is applied to the first set of second coils G2-1, to make them emit the electromagnetic signals, separately in time from the detection of the first inductive signals from the respective second set of first coils G1-2, then a first selection switch element 501 can be added as illustrated in FIG. 5a to control a period of time in which the first detection circuit 3-2 detects the inductive signals from the second set of first coils G1-2; or a first signal filter element 601 can be added to the first detection circuit 3-2 as illustrated in FIG. 5b to filter out the inductive signal detected from the second set of first coils G1-2 when the first set of second coils G2-1 emitting the electromagnetic signals.

Moreover the first detection circuit 3-2 can determine the preliminary value of the coordinate of the touch position of the electromagnetic stylus in the second direction from the first inductive signals as in the P1.1 process and FIG. 6, so a repeated description thereof will be omitted here.

With the P2.2 process described above, a rough position of the touch position of the electromagnetic stylus in the second direction can be determined rapidly at least with only one emission of the electromagnetic signals and one reception of the electromagnetic signals.

Moreover the P1.2 process to determine the preliminary value of the coordinate in the first direction can be performed synchronously (concurrently) or asynchronously (non-concurrently) with the P2.2 process to determine the preliminary value of the coordinate in the second direction. For an implementation where P1.2 is performed synchronously (concurrently) with P2.2, a third signal filter element 901 can be added to the first detection circuit 3-2 as illustrated in FIG. 9 to filter out the inductive signals generated by the first coils being induced by the first reflected signal; and alike a fourth signal filter element 1001 can be added to the second detection circuit 4-2 as illustrated in FIG. 9 to filter out the inductive signals generated by the second coils being induced by the second reflected signal.

It shall be noted that the electromagnetic signals are emitted by the first set of first coils and the reflected signal is received by the second set of second coils in the P1.2 process, but alternatively the electromagnetic signals can be emitted by any one or more first coils in the first set of first coils and the reflected signal can be received by any number of second coils in the second set of second coils in an alternative embodiment of the invention. Here the detection of the coordinate in the first direction is typically performed separately in time from the detection of the coordinate in the second direction, and for both of their drive detection principles and methods, reference can be made to P1.1 and P2.1 or P1.2 and P2.2 described above, so a repeated description thereof will be omitted here.

Moreover both P1.1 and P2.1 or P1.2 and P2.2 described above relate to preliminary detection, and in order to improve the precision of detection, the drive detection method can further involve precise detection and particularly second-direction coordinate precise detection (P3) and first-direction coordinate precise detection (P4).

Generally in precise detection, firstly the first coils or the second coils are selected, and then a drive signal is applied to and inductive signals are detected from the selected coils sequentially; and the drive signal is applied to and the inductive signal is detected from each of the coils in such a way that firstly the drive signal is applied (typically by a drive circuit) to the coil to make it emit an electromagnetic signal, and the electromagnetic stylus receives the electromagnetic signal and then resonates to generate an electromagnetic signal (referred to as a reflected electromagnetic signal) and secondly the drive signal is stopped from being applied to the coil, and the coil generates the inductive signal being induced by the reflected electromagnetic signal of the electromagnetic stylus. Each of the coils generates an inductive signal so that the touch position of the electromagnetic stylus can be determined from these inductive signals. Precise values of both the coordinate in the first direction and the coordinate in the second direction of the touch position of the electromagnetic stylus can be thus determined. In this drive detection method, each of the coils emits the electromagnetic signal and receives the reflected electromagnetic signal separately in time, whereas the precision of detection is high, so it can be referred to precise detection. The first coils are selected for precise detection of the coordinate in the second direction, and the second coils are selected for precise detection of the coordinate in the first direction.

For precise detection, firstly the first coils and the second coils are selected, that is, the first coils are selected to apply the drive signal thereto and detect the inductive signals therefrom, and the second coils are selected to apply the drive signal thereto and detect the inductive signals therefrom. Different particular schemes thereof will be described below.

In a first scheme, a predetermined number of first coils before and after the preliminary value of the coordinate in the second direction and a predetermined number of second coils before and after the preliminary value of the coordinate in the first direction are selected for precise detection.

Figure 10:
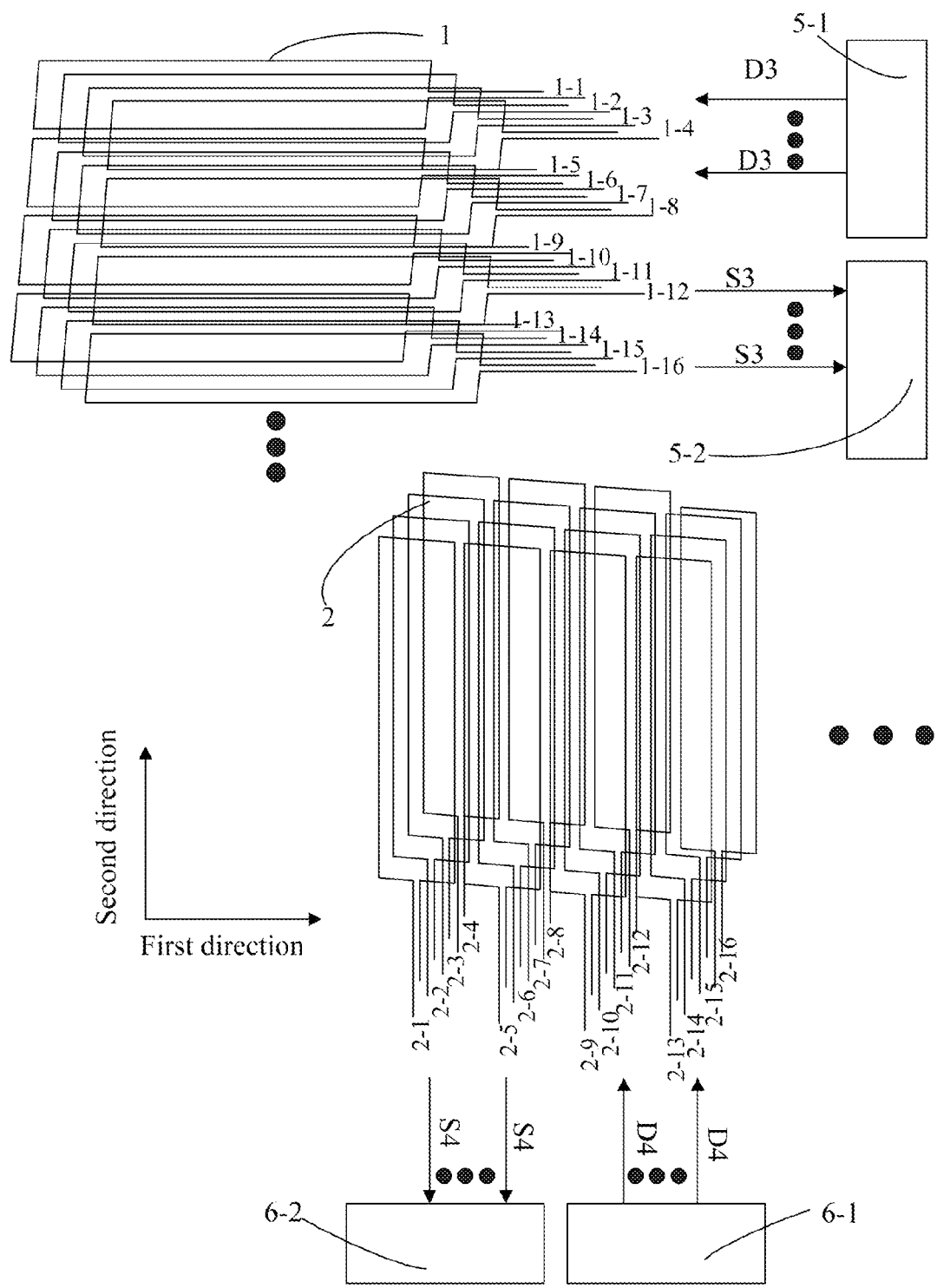
FIG. 10 is a principle diagram of precise detection according to an embodiment of the invention.

As can be further described particularly with reference to FIG. 10, for precise detection of the coordinate in the second direction, the one group of first coils (G16 in FIG. 6) corresponding to the preliminary value of the coordinate of the touch position of the electromagnetic stylus in the second direction determined in P1.1 or P2.2, M first coils before the one group of first coils and N first coils after the one group of first coils (i.e., the selected first coils) are selected, and sequentially a drive signal is applied (by a third drive circuit 5-1 as illustrated in FIG. 10) to and inductive signals are detected (by a third detection circuit 5-2 as illustrated in FIG. 10) from the selected first coils, and a third drive signal D3 is applied to each of the first coils 1 to make it emit a third electromagnetic signal (at the first frequency f1), and then it receives a third reflected signal at the first frequency generated by the first resonant circuit LC1 in the electromagnetic stylus and generates a third inductive signal S3. A third inductive signal which may or may not be zero is detected on each of the selected first coils. The third detection circuit 5-2 determines the precise value of the coordinate of the touch position of the electromagnetic stylus 20 in the second direction from these third inductive signals S3, where M and N are natural numbers (which may be zero).

Moreover it shall be noted that the third drive circuit 5-1 can be embodied as the first drive circuit 3-1, that is, the third drive circuit 5-1 is replaced by the first drive circuit 3-1; and alike the third detection circuit 5-2 can be embodied as the first detection circuit 3-2, that is, the third detection circuit 5-2 is replaced by the first detection circuit 3-2.

Figure 1A:
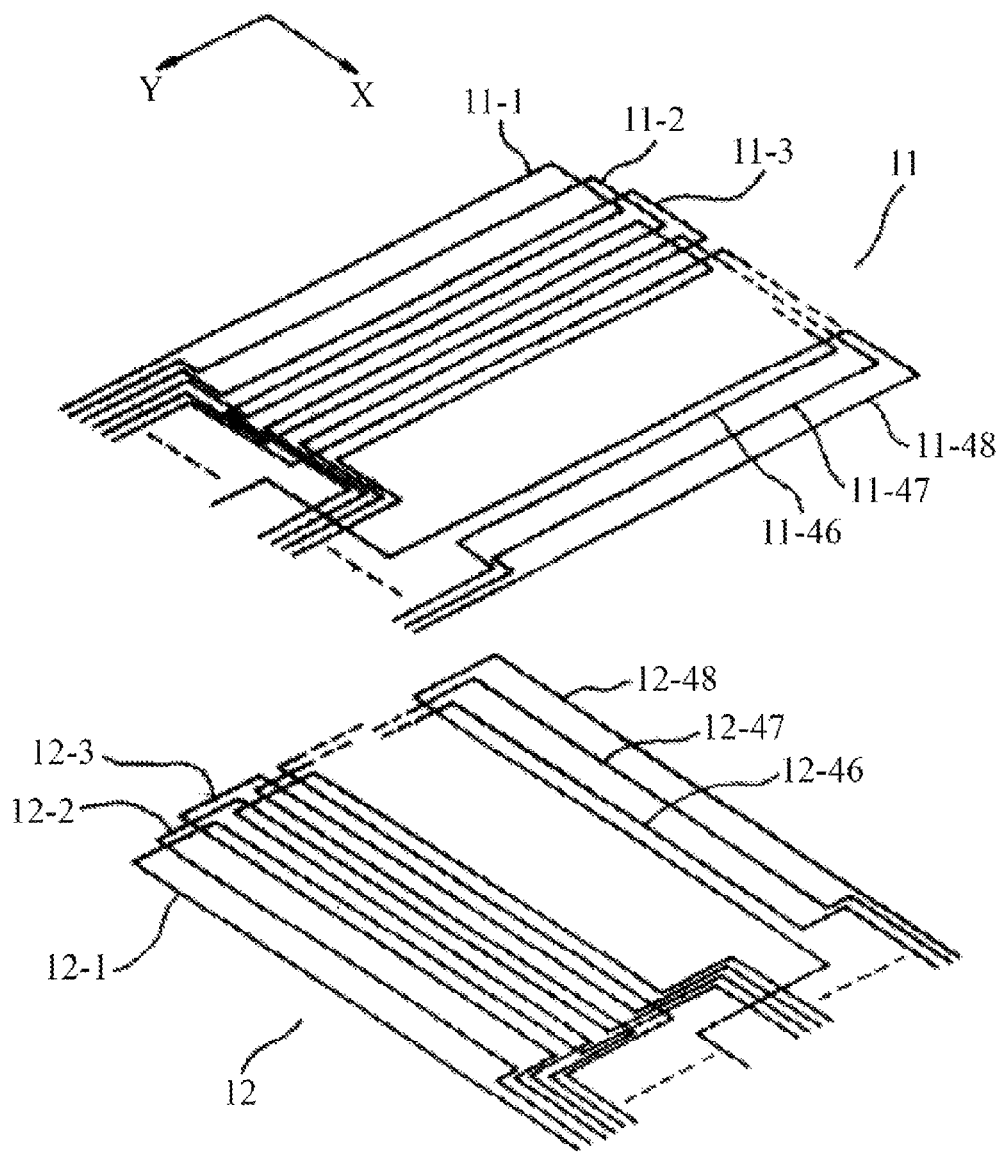
FIG. 1a is a schematic diagram of an electromagnetic inductive touch panel structure in the prior art.
Figure 1B:
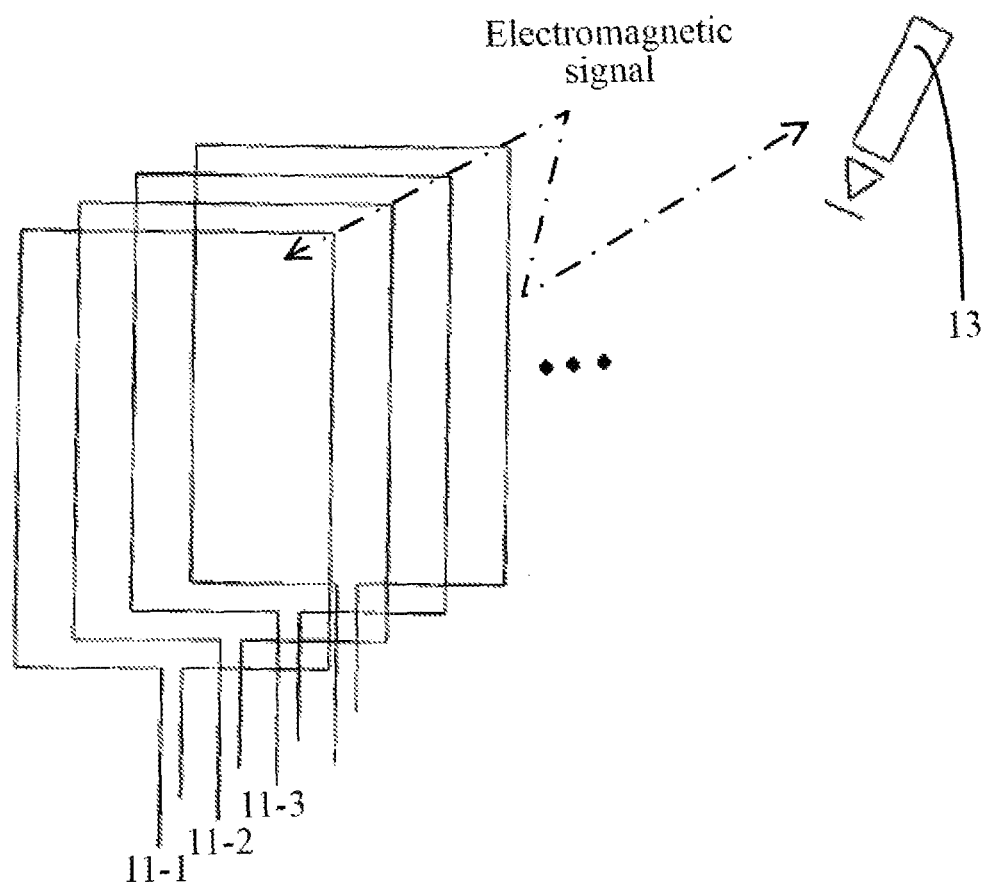
Figure 1C:
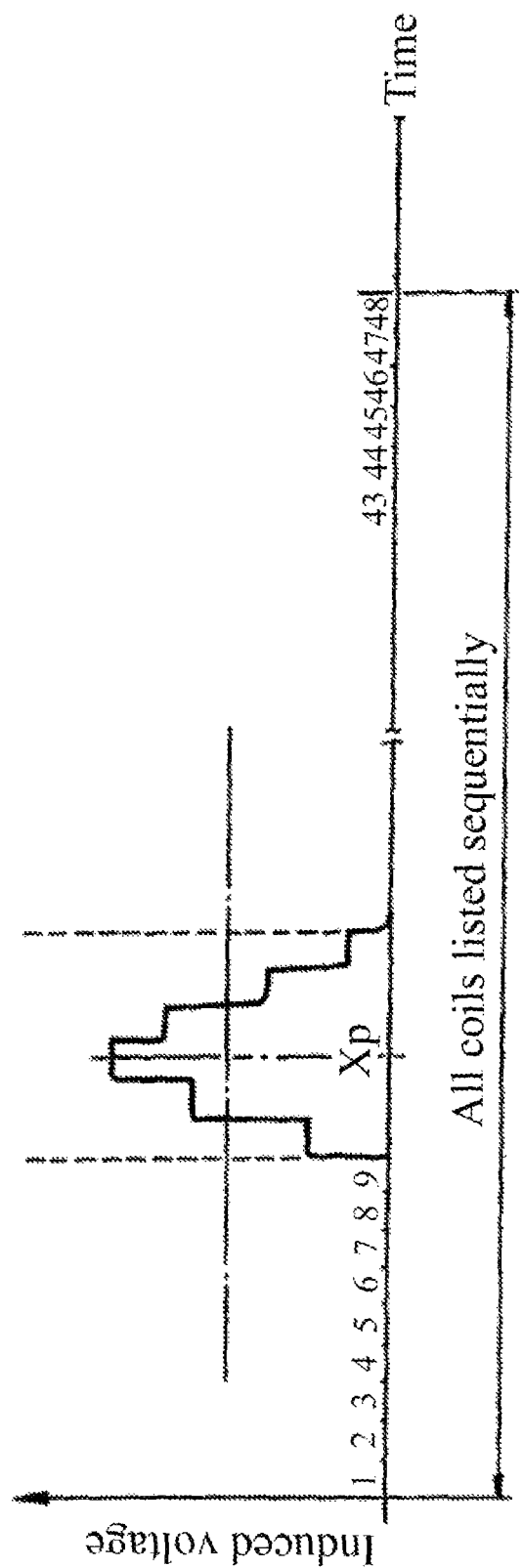
FIG. 1c is a diagram plotting inductive voltages detected from the respective first coils in FIG. 1b.

Moreover the precise value of the coordinate of the touch position of the electromagnetic stylus in the second direction can be determined from these third inductive signals as follows: function fitting (e.g., quadratic function fitting) is performed on these detected third inductive signals, and the coordinate in the second direction corresponding to the peak of a fitting curve is determined as the precise value of the coordinate of the touch position of the electromagnetic stylus in the second direction. A particular method of function fitting can be the conventional method as illustrated in FIG. 1c, so a repeated description thereof will be omitted here.

As further described with further reference to FIG. 10, for precise detection of the coordinate in the first direction, the one group of second coils (G23 in FIG. 9) corresponding to the preliminary value of the coordinate of the touch position of the electromagnetic stylus in the first direction determined in P2.1 or P1.2, P first coils before the one group of second coils, and Q second coils after the one group of second coils (i.e., the selected second coils) are selected, and sequentially a drive signal is applied (by a fourth drive circuit 6-1 as illustrated in FIG. 10) to and inductive signals are detected (by a fourth detection circuit 6-2 as illustrated in FIG. 10) from the selected second coils, and a fourth drive signal D4 is applied to each of the second coils 2 to make it emit a fourth electromagnetic signal (at the second frequency f2), and then it receives a fourth reflected signal at the second frequency generated by the second resonant circuit LC2 in the electromagnetic stylus and generates a fourth inductive signal S4. A fourth inductive signal which may or may not be zero is detected on each of the selected second coils. The fourth detection circuit 6-2 determines the precise value of the coordinate of the touch position of the electromagnetic stylus 20 in the first direction from these fourth inductive signals S4, where P and Q are natural numbers (which may be zero). Moreover it shall be noted that the fourth drive circuit 6-1 can be embodied as the second drive circuit 4-1, that is, the fourth drive circuit 6-1 is replaced by the second drive circuit 4-1; and alike the fourth detection circuit 6-2 can be embodied as the second detection circuit 4-2, that is, the fourth detection circuit 6-2 is replaced by the second detection circuit 4-2.

Moreover the precise value of the coordinate of the touch position of the electromagnetic stylus in the first direction can be determined from these fourth inductive signals as follows: function fitting (e.g., quadratic function fitting) is performed on these detected fourth inductive signals, and the coordinate in the first direction corresponding to the peak of a fitting curve is determined as the precise value of the coordinate of the touch position of the electromagnetic stylus in the first direction. A particular method of function fitting can be the conventional method as illustrated in FIG. 1c, so a repeated description thereof will be omitted here.

In the first scheme, precise detection of the coordinate in the first direction can be performed concurrently in time with or separately from precise detection of the coordinate in the second direction; and in the first scheme, any two or more of the first drive circuit 3-1, the first detection circuit 3-2, the second drive circuit 4-1, the second detection circuit 4-2, the third drive circuit 5-1, the third detection circuit 5-2, the fourth drive circuit 6-1 and the fourth detection circuit 602 for preliminary detection can be integrated in a circuit.

In a second scheme, all the first coils and all the second coils are selected for precise detection.

A drive detection mode and a principle of the second scheme are the same as those of the first scheme except for the different first coils and second coils selected for precision detection, so reference can be made to the first scheme for a particular detection process thereof, and it is not necessary to first perform preliminary detection. A brief description thereof will be given below.

Figure 11:
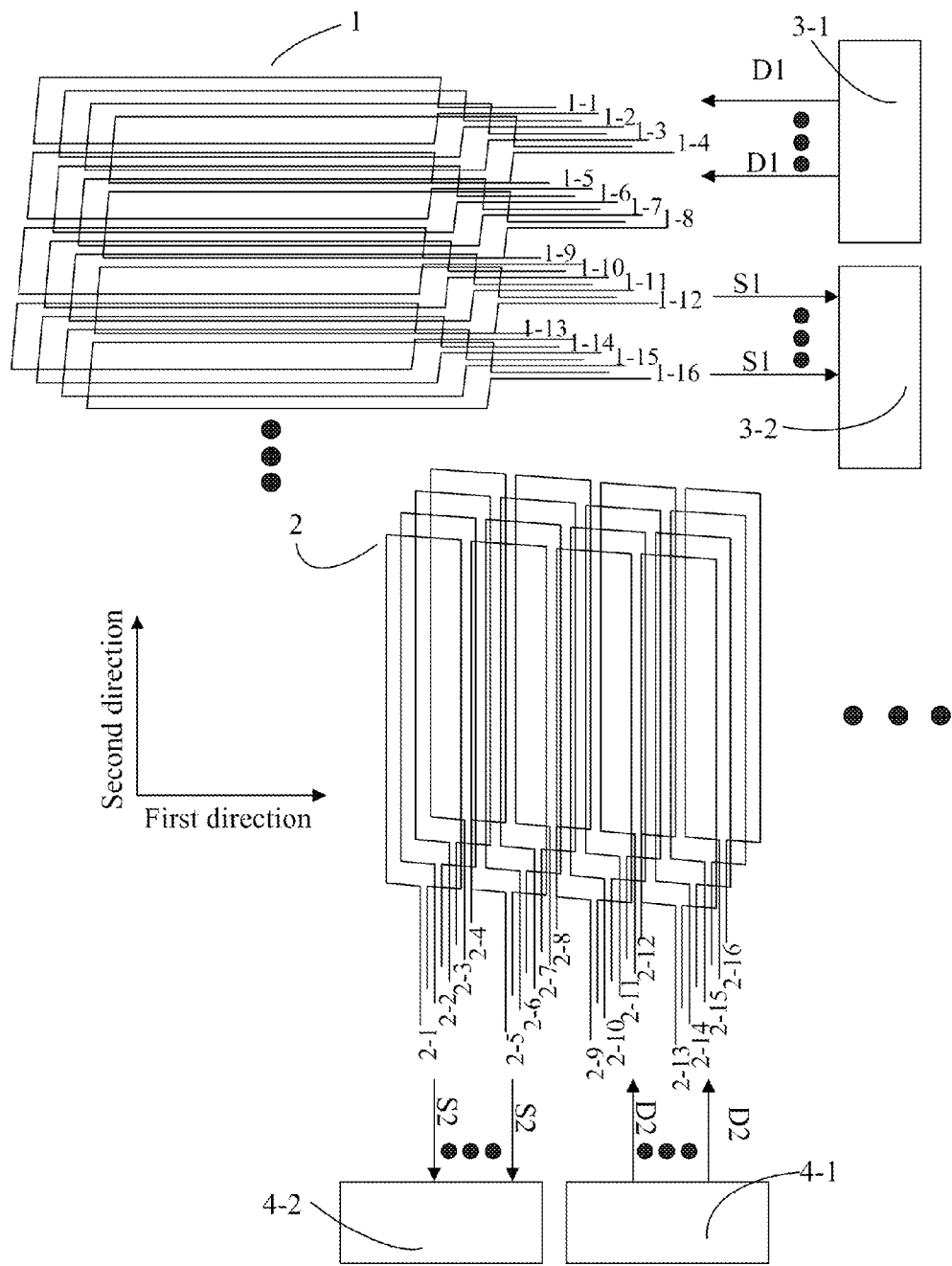
FIG. 11 is another principle diagram of precise detection according to an embodiment of the invention.

As can be further described particularly with reference to FIG. 11, where for precise detection of the coordinate in the second direction, a drive signal is applied (by a first drive circuit 3-1 as illustrated in FIG. 11) to and inductive signals are detected (by a first detection circuit 3-2 as illustrated in FIG. 11) from all the first coils (i.e., the selected first coils) sequentially, and a first drive signal D1 is applied to each of the first coils 1 to make it emit a first electromagnetic signal (at the first frequency f1), and then it receives a first reflected signal at the first frequency generated by the first resonant circuit LC1 in the electromagnetic stylus and generates a first inductive signal S1. A first inductive signal which may or may not be zero is detected on each of the selected first coils. The first detection circuit 3-2 determines the precise value of the coordinate of the touch position of the electromagnetic stylus 20 in the second direction from these first inductive signals S1.

As described with further reference to FIG. 11, for precise detection of the coordinate in the first direction, a drive signal is applied (by a second drive circuit 4-1 as illustrated in FIG. 11) to and inductive signals are detected (by a second detection circuit 4-2 as illustrated in FIG. 11) from all the second coils (i.e., the selected second coils) sequentially, and a second drive signal D2 is applied to each of the second coils 2 to make it emit a second electromagnetic signal (at the second frequency f2), and then it receives a second reflected signal at the second frequency generated by the second resonant circuit LC2 in the electromagnetic stylus and generates a second inductive signal S2. A second inductive signal which may or may not be zero is detected on each of the selected second coils. The second detection circuit 4-2 determines the precise value of the coordinate of the touch position of the electromagnetic stylus 20 in the first direction from these second inductive signals S2.

It shall be noted that in the second scheme, precise detection of the coordinate in the first direction can be performed concurrently in time with or separately from precise detection of the coordinate in the second direction; and in the second scheme, the first drive circuit 3-1 and the first detection circuit 3-2 can be integrated in a circuit.

In summary, as illustrated in FIGS. 2a, 2b and 2c, the coordinate in the first direction and the coordinate in the second direction of the electromagnetic stylus 20 including the two resonant circuits can be determined on the electromagnetic inductive touch panel 10 from direct precise detection or from direct preliminary detection or from first preliminary detection and then precise detection. For either preliminary detection or precise detection, as illustrated in FIG. 12, both emission and reflection process in the drive detection method of the touch screen include the following operations:

A first drive signal is applied to at least one (G1) first coil to make it emit a first electromagnetic signal at a first frequency, and a first resonant circuit receives the first electromagnetic signal and then resonates to generate a first reflected signal at the first frequency (i.e., a first coil emission and reflection process); and a second drive signal is applied to at least one (G2) second coil to make it emit a second electromagnetic signal at a second frequency, and a second resonant circuit receives the second electromagnetic signal and then resonates to generate a second reflected signal at the second frequency (i.e., a second coil emission and reflection process)

In a reception process of the drive detection method of the touch screen, inductive signals are detected from pre-selected first coils and second coils, that is, first inductive signals are detected from a plurality of (H1) first coils, and the coordinate value of a touch position of the electromagnetic stylus in a second direction is determined from the first inductive signals; and second inductive signals are detected from a plurality of (H2) second coils, and the coordinate value of the touch position of the electromagnetic stylus in a first direction is determined from the second inductive signals, where for precise detection or preliminary detection, the first inductive signals can be inductive signals generated by the first coils receiving the first reflected signal, and the second inductive signals can be inductive signals generated by the second coils receiving the second reflected signal. For preliminary detection, the first inductive signals can be inductive signals generated by the first coils receiving the second reflected signal, and the second inductive signals can be inductive signals generated by the second coils receiving the first reflected signal.

For precise detection, the coils emitting the electromagnetic signals are the same as the coils receiving the reflected signals for either the first coils or the second coils. Specifically the first coils emitting the first electromagnetic signals are the same as the first coils receiving the first reflected signal (G1=H1, where H1 is an integer larger than 1), and particularly in precise detection of the coordinate in the second direction in the drive detection method, the first drive signal is applied to and the inductive signals are detected from the H1 first coils sequentially, and the first drive signal is applied to each of the first coils to make it emit the first electromagnetic signal, and then it receives the first reflected signal at the first frequency generated by the first resonant circuit in the electromagnetic stylus and generates the first inductive signal, and the coordinate value of the touch position of the electromagnetic stylus in the second direction is determined from the first inductive signals. Alike the second coils emitting the electromagnetic signals are the same as the second coils receiving the second reflected signal (G2=H2, where H2 is an integer larger than 1), and particularly in precise detection of the coordinate in the first direction in the drive detection method, the second drive signal is applied to and the inductive signals are detected from the H2 second coils sequentially, and the second drive signal is applied to each of the second coils to make it emit the second electromagnetic signal, and then it receives the second reflected signal at the second frequency generated by the second resonant circuit in the electromagnetic stylus and generates the second inductive signal, and the coordinate value of the touch position of the electromagnetic stylus in the first direction is determined from the second inductive signals. Particularly the coordinate value in the second direction can be determined by performing quadratic function fitting on all the first inductive signals and determining the coordinate value in the second direction corresponding to the peak of the quadratic function fitting as the coordinate value of the touch position of the electromagnetic stylus in the second direction; and the coordinate value in the first direction can be determined by performing quadratic function fitting on all the second inductive signals and determining the coordinate value in the first direction corresponding to the peak of the quadratic function fitting as the coordinate value of the touch position of the electromagnetic stylus in the first direction. Moreover the H1 first coils can be all the first coils, and the H2 second coils can be all the second coils, which corresponds to the second scheme of precise detection described above.

The H1 first coils and the H2 second coils can also be selected for preliminary detection particularly in various selection patterns.

In a first selection pattern:

A plurality of (i.e. all the) first coils 1 illustrated in FIG. 2c are grouped into a plurality of groups of first coils G11, G12, G13, . . . . Each group includes at least one first coil, the plurality of groups of first coils are grouped into a first set of first coils G1-1 and a second set of first coils G1-2, and the respective groups of first coils G11, G13, . . . , in the first set of first coils G1-1 are arranged alternating with the respective groups of first coils G12, G14, . . . , in the second set of first coils G1-2; and a plurality of (i.e. all the) second coils 2 illustrated in FIG. 2c are grouped into a plurality of groups of second coils G21, G22, G23, . . . , each of which includes at least one second coil, the plurality of groups of second coils are grouped into a first set of second coils G2-1 and a second set of second coils G2-2, and the respective groups of second coils G21, G23, . . . , in the first set of second coils G2-1 are arranged alternating with the respective groups of second coils G22, G24, . . . , in the second set of second coils G2-2;

A third drive signal is applied concurrently to the first set of first coils G1-1 to make them emit third electromagnetic signals, the second set of first coils G1-2 receive a third reflected signal at the first frequency generated from the first resonant circuit LC1 in the electromagnetic stylus and generate third inductive signals, and a preliminary value of the coordinate of the touch position of the electromagnetic stylus 20 in the second direction is determined from the third inductive signals (i.e., second-direction preliminary detection);

A fourth drive signal is applied concurrently to the first set of second coils G2-1 to make them emit fourth electromagnetic signals, the second set of second coils G2-2 receive a fourth reflected signal at the second frequency generated from the second resonant circuit LC2 in the electromagnetic stylus and generate fourth inductive signals, and a preliminary value of the coordinate of the touch position of the electromagnetic stylus 20 in the first direction is determined from the fourth inductive signals (i.e., first-direction preliminary detection); and One group of first coils corresponding to the preliminary value of the coordinate in the second direction, M first coils before the one group of first coils, and N first coils after the one group of first coils are selected as the H1 first coils; and one group of second coils corresponding to the preliminary value of the coordinate in the first direction, P second coils before the one group of second coils, and Q second coils after the one group of second coils are selected as the H2 second coils.

It shall be noted that the preliminary detection process described in the first selection pattern is substantially the same as P1.1 and P2.1 processes described above. Merely for the sake of a convenient description of the first selection pattern, the first drive signal is applied to the first coils, and the first inductive signals are detected from the first coils, and the second drive signal is applied to the second coils, and the second inductive signals are detected from the second coils in the precise detection process; and the third drive signal is applied to the first coils, and the third inductive signals are detected from the first coils, and the fourth drive signal is applied to the second coils, and the fourth inductive signals are detected from the second coils in the preliminary detection process. In the P1.1 and P2.1 processes described above, the first drive signal is applied to the first coils, and the first inductive signals are detected from the first coils, and the second drive signal is applied to the second coils, and the second inductive signals are detected from the second coils in the preliminary detection process; and the third drive signal is applied to the first coils, and the third inductive signals are detected from the first coils, and the fourth drive signal is applied to the second coils, and the fourth inductive signals are detected from the second coils in the precise detection process. A difference between them lies in the different denominations of the signals.

In a second selection pattern:

A plurality of (i.e. all the) first coils 1 illustrated in FIG. 2c are grouped into a plurality of groups of first coils G11, G12, G13, . . . , each of which includes at least one first coil, the plurality of groups of first coils are grouped into a first set of first coils G1-1 and a second set of first coils G1-2, and the respective groups of first coils G11, G13, . . . , in the first set of first coils G1-1 are arranged alternating with the respective groups of first coils G12, G14, . . . , in the second set of first coils G1-2; and a plurality of (i.e. all the) second coils 2 illustrated in FIG. 2c are grouped into a plurality of groups of second coils G21, G22, G23, . . . , each of which includes at least one second coil, the plurality of groups of second coils are grouped into a first set of second coils G2-1 and a second set of second coils G2-2, and the respective groups of second coils G21, G23, . . . , in the first set of second coils G2-1 are arranged alternating with the respective groups of second coils G22, G24, . . . , in the second set of second coils G2-2;

A third drive signal is applied to the first set of first coils G1-1 simultaneously to make them emit third electromagnetic signals, the second set of second coils G2-2 receive a third reflected signal at the first frequency generated from the first resonant circuit LC1 in the electromagnetic stylus and generate fourth inductive signals, and a preliminary value of the coordinate of the touch position of the electromagnetic stylus 20 in the first direction is determined from the fourth inductive signals (i.e., first-direction preliminary detection);

A fourth drive signal is applied to the first set of second coils G2-1 simultaneously to make them emit fourth electromagnetic signals, the second set of first coils G1-2 receive a fourth reflected signal at the second frequency generated from the second resonant circuit LC2 in the electromagnetic stylus and generate third inductive signals, and a preliminary value of the coordinate of the touch position of the electromagnetic stylus 20 in the second direction is determined from the third inductive signals (i.e., second-direction preliminary detection); and One group of first coils corresponding to the preliminary value of the coordinate in the second direction, M first coils before the one group of first coils, and N first coils after the one group of first coils are selected as the H1 first coils; and one group of second coils corresponding to the preliminary value of the coordinate in the first direction, P second coils before the one group of second coils, and Q second coils after the one group of second coils are selected as the H2 second coils.

It shall be noted that the preliminary detection process described in the second selection pattern is substantially the same as P1.2 and P2.2 processes described above. Merely for the sake of a convenient description of the second selection pattern, the first drive signal is applied to the first coils, and the first inductive signals are detected from the second coils, and the second drive signal is applied to the second coils, and the second inductive signals are detected from the first coils in the precise detection process; and the third drive signal is applied to the first coils, and the fourth inductive signals are detected from the second coils, and the fourth drive signal is applied to the second coils, and the third inductive signals are detected from the first coils in the preliminary detection process. In the P1.2 and P2.2 processes described above, the first drive signal is applied to the first coils, and the first inductive signals are detected from the second coils, and the second drive signal is applied to the second coils, and the second inductive signals are detected from the first coils in the preliminary detection process; and the third drive signal is applied to the first coils, and the fourth inductive signals are detected from the second coils, and the fourth drive signal is applied to the second coils, and the third inductive signals are detected from the first coils in the precise detection process. A difference between them lies in the different denominations of the signals.

FIG. 13 illustrates a drive detection method involving firstly preliminary detection and then precise detection.

In either the first selection pattern or the second selection pattern, the first set of first coils G1-1 can be odd groups of first coils, and the second set of first coils G1-2 can be even groups of first coils; or the first set of first coils G1-1 can be even groups of first coils, and the second set of first coils G1-2 can be odd groups of first coils. Correspondingly the first set of second coils G2-1 can be odd groups of second coils, and the second set of second coils G2-2 can be even groups of second coils; or the first set of second coils G2-1 can be even groups of second coils, and the second set of second coils G2-2 can be odd groups of second coils. Moreover in either the first selection pattern or the second selection pattern, the position of a group of first coils in the second set of first coils corresponding to the largest one of the third inductive signals can be selected as the preliminary value of the coordinate of the touch position of the electromagnetic stylus in the first direction, and the position of a group of second coils in the second set of second coils corresponding to the largest one of the fourth inductive signals can be selected as the preliminary value of the coordinate of the touch position of the electromagnetic stylus in the second direction.

A coordinate input device according to an embodiment of the invention (as illustrated in FIG. 14) includes an electromagnetic stylus 20 and the electromagnetic inductive touch panel 10 according to the embodiment described in FIG. 2C. The coordinate input device can further include a display panel (not illustrated), and the electromagnetic inductive touch panel 10 can be arranged separate from the display panel (the add-on type), or the electromagnetic inductive touch panel 10 can be integrated in the display panel (the on-cell type or the in-cell type). The electromagnetic inductive touch display panel can be a liquid crystal display panel or an electronic paper or a plasma display panel or an organic light emitting diode display panel.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. An electromagnetic inductive touch panel for detecting a touch position of an electromagnetic stylus, the electromagnetic stylus comprising a first resonant circuit and a second resonant circuit, the electromagnetic inductive touch panel comprising:
   a plurality of first coils extending in a first direction, wherein at least one of the plurality of first coils emits a first electromagnetic signal at a first frequency, and the first resonant circuit receives the first electromagnetic signal and then resonates to generate a first reflected signal at the first frequency; and
   a plurality of second coils extending in a second direction, wherein at least one of the plurality of second coils emits a second electromagnetic signal at a second frequency, and the second resonant circuit receives the second electromagnetic signal and then resonates to generate a second reflected signal at the second frequency.

2. The electromagnetic inductive touch panel according to claim 1, wherein at least one of the first resonant circuit and the second resonant circuit are LC resonant circuits.

3. The electromagnetic inductive touch panel according to claim 1, wherein the process in which the at least one of the plurality of first coils emits the first electromagnetic signal at the first frequency and the first resonant circuit receives the first electromagnetic signal and then resonates to generate the first reflected signal at the first frequency is performed synchronously or asynchronously with the process in which the at least one of the second coils emits the second electromagnetic signal at the second frequency and the second resonant circuit receives the second electromagnetic signal and then resonates to generate the second reflected signal at the second frequency.

4. The electromagnetic inductive touch panel according to claim 1, wherein H1 first coils receive the first reflected signal and generate a first plurality of inductive signals, and H2 second coils receive the second reflected signal and generate a second plurality of inductive signals; or
   H1 first coils receive the second reflected signal and generate the first plurality of inductive signals, and H2 second coils receive the first reflected signal and generate the second plurality of inductive signals,
   wherein both H1 and H2 are integers larger than or equal to 2.

5. The electromagnetic inductive touch panel according to claim 4, wherein the electromagnetic inductive touch panel further comprises: a first drive circuit providing the at least one of the first coils with a first drive signal; a second drive circuit providing the at least one of the second coils with a second drive signal; a first detection circuit detecting the first inductive signals from the H1 first coils and determining the coordinate value of the touch position of the electromagnetic stylus in the second direction from the first plurality of inductive signals; and a second detection circuit detecting the second inductive signals from the H2 second coils and determining the coordinate value of the touch position of the electromagnetic stylus in the first direction from the second plurality of inductive signals.

6. The electromagnetic inductive touch panel according to claim 5, wherein the plurality of first coils comprise a plurality of groups of first coils, each of the plurality of groups of first coils comprising at least one of the first coils, the plurality of groups of first coils are grouped into a first set of first coils and a second set of first coils, and the respective groups of first coils in the first set of first coils are arranged alternating with the respective groups of first coils in the second set of first coils; and the plurality of second coils comprise a plurality of groups of second coils, each of the plurality of groups of second coils comprising at least one of the second coils, the plurality of groups of second coils are grouped into a first set of second coils and a second set of second coils, and the respective groups of second coils in the first set of second coils are arranged alternating with the respective groups of second coils in the second set of second coils.

7. The electromagnetic inductive touch panel according to claim 6, wherein the first set of first coils are odd groups of first coils and the second set of first coils are even groups of first coils, or the first set of first coils are even groups of first coils and the second set of first coils are odd groups of first coils; and the first set of second coils are odd groups of second coils and the second set of second coils are even groups of second coils; or the first set of second coils are even groups of second coils, and the second set of second coils are odd groups of second coils.

8. The electromagnetic inductive touch panel according to claim 6, wherein the first set of first coils receive the first drive signal from the first drive circuit and emit the first electromagnetic signals concurrently, the second set of first coils receive the first reflected signal and generate the first inductive signals, and the first detection circuit determines a preliminary value of the coordinate of the touch position of the electromagnetic stylus in the second direction from the first inductive signals; and the first set of second coils receive the second drive signal from the second drive circuit and emit the second electromagnetic signals concurrently, the second set of second coils receive the second reflected signal and generate the second inductive signals, and the second detection circuit determines a preliminary value of the coordinate of the touch position of the electromagnetic stylus in the first direction from the second inductive signals;

or the first set of first coils receive the first drive signal from the first drive circuit and emit the first electromagnetic signals concurrently, the second set of second coils receive the first reflected signal and generate the second inductive signals, and the second detection circuit determines a preliminary value of the coordinate of the touch position of the electromagnetic stylus in the first direction from the second inductive signals; and the first set of second coils receive the second drive signal from the second drive circuit and emit the second electromagnetic signals concurrently, the second set of first coils receive the second reflected signal and generate the first inductive signals, and the first detection circuit determines a preliminary value of the coordinate of the touch position of the electromagnetic stylus in the second direction from the first inductive signals.

9. The electromagnetic inductive touch panel according to claim 8, wherein after preliminary values of the coordinate in the first direction and the coordinate in the second direction of the touch position of the electromagnetic stylus being determined, the first drive circuit and the first detection circuit select one group of first coils corresponding to the preliminary value of the coordinate of the touch position of the electromagnetic stylus in the second direction, M first coils before the one group of first coils, and N first coils after the one group of first coils, and sequentially apply a drive signal to and detect inductive signals from the selected first coils, a third drive signal is applied to each of the first coils to make it emit a third electromagnetic signal, and then it receives a third reflected signal at the first frequency generated by the first resonant circuit in the electromagnetic stylus and generates a third inductive signal, and the first detection circuit determines a precise value of the coordinate of the touch position of the electromagnetic stylus in the second direction from the third inductive signal, and wherein M and N are natural numbers.

10. The electromagnetic inductive touch panel according to claim 9, wherein after the preliminary values of the coordinate in the first direction and the coordinate in the second direction of the touch position of the electromagnetic stylus being determined, the second drive circuit and the second detection circuit select one group of second coils corresponding to the preliminary value of the coordinate of the touch position of the electromagnetic stylus in the first direction, P second coils before the one group of second coils, and Q second coils after the one group of second coils, and sequentially apply a drive signal to and detect inductive signals from the selected second coils, a fourth drive signal is applied to each of the second coils to make it emit a fourth electromagnetic signal, and then it receives a fourth reflected signal at the second frequency generated by the second resonant circuit in the electromagnetic stylus and generates a fourth inductive signal, and the second detection circuit determines a precise value of the coordinate of the touch position of the electromagnetic stylus in the first direction from the fourth inductive signal, and wherein P and Q are natural numbers.

11. The electromagnetic inductive touch panel according to claim 10, wherein the first detection circuits performs quadratic function fitting on all the third inductive signals and determines the coordinate value in the second direction corresponding to the peak of the quadratic function fitting as the precise value of the coordinate of the touch position of the electromagnetic stylus in the second direction; and the second detection circuits performs quadratic function fitting on all the fourth inductive signals and determines the coordinate value in the first direction corresponding to the peak of the quadratic function fitting as the precise value of the coordinate of the touch position of the electromagnetic stylus in the first direction.

12. The electromagnetic inductive touch panel according to claim 1, wherein the electromagnetic inductive touch panel further comprises a first drive circuit and a first detection circuit, which apply a drive signal to and detect inductive signals from the plurality of first coils sequentially, a first drive signal is applied to each of the first coils to make it emit the first electromagnetic signal, and then it receives the first reflected signal at the first frequency generated by the first resonant circuit in the electromagnetic stylus and generates a first inductive signal, and the first detection circuit determines a precise value of the coordinate of the touch position of the electromagnetic stylus in the second direction from the first inductive signals.

13. The electromagnetic inductive touch panel according to claim 1, wherein the electromagnetic inductive touch panel further comprises a second drive circuit and a second detection circuit, which apply a drive signal to and detect inductive signals from the plurality of second coils sequentially, a second drive signal is applied to each of the second coils to make it emit the second electromagnetic signal, and then it receives the second reflected signal at the second frequency generated by the second resonant circuit in the electromagnetic stylus and generates a second inductive signal, and the second detection circuit determines a precise value of the coordinate of the touch position of the electromagnetic stylus in the first direction from the second inductive signals.

14. A coordinate input apparatus, comprising:
an electromagnetic stylus comprising a first resonant circuit and a second resonant circuit; and
an electromagnetic inductive touch panel for detecting a touch position of the electromagnetic stylus, the electromagnetic inductive touch panel comprising:
a plurality of first coils extending in a first direction, wherein at least one of the first coils emits a first electromagnetic signal at a first frequency, and the first resonant circuit receives the first electromagnetic signal and then resonates to generate a first reflected signal at the first frequency; and
a plurality of second coils extending in a second direction, wherein at least one of the second coils emits a second electromagnetic signal at a second frequency, and the second resonant circuit receives the second electromagnetic signal and then resonates to generate a second reflected signal at the second frequency.

15. A drive detection method of an electromagnetic inductive touch panel to detect a touch position of an electromagnetic stylus comprising a first resonant circuit and a second resonant circuit, the electromagnetic inductive touch panel comprising a plurality of first coils extending in a first direction and a plurality of second coils extending in a second direction, wherein:
the drive detection method comprises:
applying a first drive signal to at least one of the first coils to make it emit a first electromagnetic signal at a first frequency, wherein the first electromagnetic signal is received by the first resonant circuit to generate a first reflected signal at the first frequency; and
applying a second drive signal to at least one of the second coils to make it emit a second electromagnetic signal at a second frequency, wherein the second electromagnetic signal is received by the second resonant circuit to generate a second reflected signal at the second frequency.

16. The drive detection method according to claim 15, wherein first inductive signals are detected from H1 first coils, and the coordinate value of the touch position of the electromagnetic stylus in the second direction is determined from the first inductive signals; and second inductive signals are detected from H2 second coils, and the coordinate value of the touch position of the electromagnetic stylus in the first direction is determined from the second inductive signals, and wherein both H1 and H2 are integers larger than or equal to 2.

17. The drive detection method according to claim 16, wherein the first coils emitting the first electromagnetic signals are the same as the H1 first coils, and the drive detection method particularly comprises: applying the first drive signal to and detecting the inductive signals from the H1 first coils sequentially, and applying the first drive signal to each of the first coils to make it emit the first electromagnetic signal so that then it receives the first reflected signal at the first frequency generated by the first resonant circuit in the electromagnetic stylus and generates the first inductive signal, and determining the coordinate value of the touch position of the electromagnetic stylus in the second direction from the first inductive signals.

18. The drive detection method according to claim 17, wherein the second coils emitting the second electromagnetic signals are the same as the H2 second coils, and the drive detection method particularly comprises: applying the second drive signal to and detecting the inductive signals from the H2 second coils sequentially, and applying the second drive signal to each of the second coils to make it emit the second electromagnetic signal so that then it receives the second reflected signal at the second frequency generated by the second resonant circuit in the electromagnetic stylus and generates the second inductive signal, and determining the coordinate value of the touch position of the electromagnetic stylus in the first direction from the second inductive signals.

19. The drive detection method according to claim 18, wherein quadratic function fitting is performed on all the first inductive signals and the coordinate value in the second direction corresponding to the peak of the quadratic function fitting is determined as the coordinate value of the touch position of the electromagnetic stylus in the second direction; and quadratic function fitting is performed on all the second inductive signals and the coordinate value in the first direction corresponding to the peak of the quadratic function fitting is determined as the coordinate value of the touch position of the electromagnetic stylus in the first direction.

20. The drive detection method according to claim 18, wherein the H1 first coils are all the first coils, and the H2 second coils are all the second coils.

21. The drive detection method according to claim 18, wherein
the H1 first coils and the H2 second coils are selected by:
grouping the plurality of first coils into a plurality of groups of first coils, each of which comprises at least one of the first coils, and grouping the plurality of groups of first coils into a first set of first coils and a second set of first coils so that the respective groups of first coils in the first set of first coils are arranged alternating with the respective groups of first coils in the second set of first coils;
grouping the plurality of second coils comprise a plurality of groups of second coils, each of which comprises at least one of the second coils, and grouping the plurality of groups of second coils are grouped into a first set of second coils and a second set of second coils so that the respective groups of second coils in the first set of second coils are arranged alternating with the respective groups of second coils in the second set of second coils;
applying a third drive signal concurrently to the first set of first coils to make them emit third electromagnetic signals, and the second set of first coils receiving a third reflected signal at the first frequency generated from the first resonant circuit in the electromagnetic stylus and generating third inductive signals, and determining a preliminary value of the coordinate of the touch position of the electromagnetic stylus in the second direction from the third inductive signals;
applying a fourth drive signal concurrently to the first set of second coils to make them emit fourth electromagnetic signals, and the second set of second coils receiving a fourth reflected signal at the second frequency generated from the second resonant circuit in the electromagnetic stylus and generating fourth inductive signals, and determining a preliminary value of the coordinate of the touch position of the electromagnetic stylus in the first direction from the fourth inductive signals;
selecting one group of first coils corresponding to the preliminary value of the coordinate in the second direction, M first coils before the one group of first coils, and N first coils after the one group of first coils as the H1 first coils; and selecting one group of second coils corresponding to the preliminary value of the coordinate in the first direction, P second coils before the one group of second coils, and Q second coils after the one group of second coils as the H2 second coils;

or the H1 first coils and the H2 second coils are selected by:

grouping the plurality of first coils into a plurality of groups of first coils, each of which comprises at least one of the first coils, and grouping the plurality of groups of first coils into a first set of first coils and a second set of first coils so that the respective groups of first coils in the first set of first coils are arranged alternating with the respective groups of first coils in the second set of first coils;

grouping the plurality of second coils comprise a plurality of groups of second coils, each of which comprises at least one of the second coils, and grouping the plurality of groups of second coils are grouped into a first set of second coils and a second set of second coils so that the respective groups of second coils in the first set of second coils are arranged alternating with the respective groups of second coils in the second set of second coils;

applying a third drive signal concurrently to the first set of first coils to make them emit third electromagnetic signals, and the second set of second coils receiving a third reflected signal at the first frequency generated from the first resonant circuit in the electromagnetic stylus and generating fourth inductive signals, and determining a preliminary value of the coordinate of the touch position of the electromagnetic stylus in the first direction from the fourth inductive signals;

applying a fourth drive signal concurrently to the first set of second coils to make them emit fourth electromagnetic signals, and the second set of first coils receiving a fourth reflected signal at the second frequency generated from the second resonant circuit in the electromagnetic stylus and generating third inductive signals, and determining a preliminary value of the coordinate of the touch position of the electromagnetic stylus in the second direction from the third inductive signals;

selecting one group of first coils corresponding to the preliminary value of the coordinate in the second direction, M first coils before the one group of first coils, and N first coils after the one group of first coils as the H1 first coils; and selecting one group of second coils corresponding to the preliminary value of the coordinate in the first direction, P second coils before the one group of second coils, and Q second coils after the one group of second coils as the H2 second coils.

22. The drive detection method according to claim 21, wherein the first set of first coils are odd groups of first coils and the second set of first coils are even groups of first coils, or the first set of first coils are even groups of first coils and the second set of first coils are odd groups of first coils; and the first set of second coils are odd groups of second coils and the second set of second coils are even groups of second coils, or the first set of second coils are even groups of second coils and the second set of second coils are odd groups of second coils.

23. The drive detection method according to claim 21, wherein the position of a group of first coils in the second set of first coils corresponding to the largest one of the third inductive signals is selected as the preliminary value of the coordinate of the touch position of the electromagnetic stylus in the second direction, and the position of a group of second coils in the second set of second coils corresponding to the largest one of the fourth inductive signals is selected as the preliminary value of the coordinate of the touch position of the electromagnetic stylus in the first direction.

* * * * *